United States Patent [19]

Kaliski

[11] Patent Number: 5,279,663
[45] Date of Patent: Jan. 18, 1994

[54] LOW-REFRACTIVE-INDEX AGGREGATE PIGMENTS PRODUCTS

[75] Inventor: Adam F. Kaliski, East Windsor, N.J.

[73] Assignee: Industrial Progesss, Inc., East Windsor, N.J.

[21] Appl. No.: 811,623

[22] Filed: Dec. 23, 1991

Related U.S. Application Data

[63] Continuation-in-part of Ser. No. 743,916, Aug. 12, 1991, abandoned, which is a continuation-in-part of Ser. No. 420,472, Oct. 12, 1989, abandoned.

[51] Int. Cl.$^5$ ............................................. C04B 14/04
[52] U.S. Cl. .................................. 106/486; 106/416; 106/464; 106/483
[58] Field of Search ................... 501/12; 106/416, 463, 106/464, 482, 483, 486

[56] References Cited

U.S. PATENT DOCUMENTS

| | | | |
|---|---|---|---|
| 2,974,108 | 3/1961 | Alexander | 252/313 |
| 3,476,692 | 11/1969 | Hoffmann | 252/317 |
| 3,726,700 | 4/1973 | Wildt | 106/300 |
| 5,116,418 | 5/1992 | Kaliski | 106/419 |

FOREIGN PATENT DOCUMENTS 2917313 7/1980 Fed. Rep. of Germany.

*Primary Examiner*—Karl Group
*Assistant Examiner*—Chris Gallo
*Attorney, Agent, or Firm*—Sachs & Sachs

[57] ABSTRACT

Aggregate pigment products made of low-refractive-index raw materials, in which pigmentary, subpigmentary and nonpigmentary components are cemented intrinsically with the aid of in-situ synthesized complex microgels.

14 Claims, No Drawings

LOW-REFRACTIVE-INDEX AGGREGATE PIGMENTS PRODUCTS

This application is a continuation-in-part of co-pending patent application Ser. No. 07/743,916 for "Structural Aggregate Pigments," Filed Aug. 12, 1991 now abandoned which was a continuation-in-part of patent application Ser. No. 07/420,472 for "Structural Aggregate Pigments," Filed Oct. 12, 1989 now abandoned.

BACKGROUND OF THE INVENTION

1. Field of the Invention

This invention relates to novel aggregate pigment products comprising low-refractive-index pigmentary materials.

More specifically, this invention relates to aggregate pigment products in which particles of single and multiple pigmentary species and other subpigmentary and nonpigmentary components are coflocculated and cemented intrinsically with the aid of in-situ synthesized complex (multicomponent) functional microgels.

2. Discussion of the Relevant Art

White pigments encompass a class of particulate materials which are essentially colorless, insoluble, nontoxic, reasonably nonabrasive, and have dimensions favoring a diffuse reflection, or scattering, of light constituting the visible portion of the electromagnetic spectrum with wavelengths ranging from 420 nm for violet to 660 nm for red.

In accordance with the laws of physical optics, maximum scattering of light occurs when a propagating light wave encounters in its path an obstacle, a pigment particle as the case in point, whose dimensions are equal to one-half of the length of the impinging wave. At equal particle dimensions, pigmentary materials with higher refractive indexes, whose values range from 1.41 for silica to 2.73 for rutile, scatter the light more efficiently than those with lower ones.

The most elementary physical model of light scattering may be considered one in which monochromatic light is diffracted by a single spherical particle. Maximum diffraction of the blue, green and red portions of the light spectrum (additive primary components of light) by spherical particles is obtained when the latter have diameters of about 150 nm, 200 nm and 250 nm, respectively. By integrating the comprehensive spectral response of a single spherical particle scattering polychromatic light, mapped as a function of particle diameter, one can calculate that the maximum light scattering occurs with a particle having a diameter of about 200 nm.

A universally useful physical model of light scattering by pigments must, understandably, be applicable both to any arbitrary pigment shape (virtually all inorganic pigments, other than $TiO_2$, are nonspherical) as well as to integral end-use formations containing these pigments, such as paper-coating and paint films, filled paper or pigmented plastics. Let us consider, for example, a single, highly anisometric particle of kaolin clay in the form of a hexagonal platelet. The light waves of different lengths impinging upon such a multifaceted platelet are scattered with different intensities depending on how closely the dimensions of a particular facet of this platelet approximate one-half of the length of the impinging light wave. Among the multitude of geometrical facets by which the impinging light may be scattered are, for example, platelet faces (in the x,y plane) or edges and protrusions from platelet surfaces (in z direction). Moreover, the impinging light waves are scattered independently by each of the six triangular tips of the hexagonal platelet, the shorter waves being scattered more efficiently closer to the tips, across shorter distances, while the longer waves are being scattered more efficiently farther from the tips, across longer distances.

The ability to scatter light is a universal property both of particulate and extensive matter. Hence, even an "infinitely" large, most precisely polished mirror also scatters light, though only to a very negligible extent. In general, all light waves, regardless of length, will scatter with different intensities across all physical obstacles encountered in their path, such as individual particles or parts of aggregated matter, grain boundaries, or sites of localized stress concentrations giving rise to elasto-optical effects.

As far as white pigments are concerned, it should be emphasized that the latter represent a pragmatic class of particulate materials, useful in the trade, whose features are defined by a convention. In the very minimum, pigments must consist to a predominant extent of particles whose dimensions uniquely favor the scattering of light, not so much with regard to the performance of individual particles but primarily with regard to the performance of the resultant end-use formations containing these particles. The latter requirement necessitates that pigments additionally possess certain specific features and performance properties, whose scope is not fixed, however, but expands in keeping pace with the scientific and technological advancements in the field of pigments.

Whether a solid particle can be classified as pigmentary depends not only upon raw physical dimensions but also upon the particle's morphology. Hence, monolithic, spherical, virtually perfectly isometric, single-faceted particles of $TiO_2$, or organic pigments, cease to be pigmentary for all practical purposes when their particle diameters exceed about 1 $\mu$m. Overall, the spherical shape is disadvantageous for pigment particles in geometric bodies scatter the light more selectively, hence, less efficiently, than analogous anisometric particles of an equivalent mass. Furthermore, spheres have an inherent tendency to form closely packed structures characterized by a low void volume and poor light-scattering efficacy. A closely packed ensemble of monodisperse spheres has a maximum void volume of only about 26% which, for polydisperse spheres, can fall below 15%, or even 10%.

Multifaceted pigment particles, such as inherently aggregated clusters of elementary, ultrafine (subpigmentary) particles of precipitated silica or metal silicates, on the other hand, can be as large as 10 $\mu$m, or even 20 $\mu$m, e.s.d. (equivalent spherical diameter) and still be pigment worthy. Regardless of morphological features, however, all ultrafine particulate materials with dimensions finer than 0.1 $\mu$m e.s.d. are not pigment worthy, being classified as "subpigmentary." It should be pointed out, though, that inherently fine-particle-size pigment products, such as titanium dioxide or high-glossing kaolin clay, may contain a substantial proportion of subpigmentary particles.

White pigments traditionally have been divided in the art into "primary," having a refractive index of about 2.0 or higher, and "secondary," with a refractive index ranging from approximately 1.4 to 1.65. Following the example of lithopone, introduced on the market around 1875, interspacing of particles of high-refractive-index primary pigments with particles of low-refractive-index secondary ones has become a standing practice in the paper and paint industries. As the first composite pigment ever, obtained by coprecipitating birefringent zinc sulfide (refractive indexes of 2.356 and 2.378), used in proportion of from 30 to 60%, by weight, with barium sulfate (refractive index 1.64), lithopone represents a classical case of a virtually perfect interspacing ("extension") of a primary pigment with a secondary one.

As titanium dioxide ($TiO_2$) was introduced on the market in 1919, rapidly becoming the dominant high-refractive-index white pigment on the market, it became instantly clear that the most economical performance is obtained when $TiO_2$ is used in blends with less expensive, low-refractive-index co-pigments. It was also recognized, however, that a great deal of detrimental selective fractionation and flocculation occurs in practical applications involving the use of such loose pigment blends. Various composite pigments were thus developed in which the primary pigments, e.g., titanium dioxide or zinc sulfide (ZnS), were first intimately blended with, and subsequently affixed to, secondary pigments (extenders) to achieve a permanent immobilization of both particulate species relative to each other.

It should be emphasized that the aggregation, as such, was never considered as a goal in itself in making composite pigment products from extraneous primary and secondary pigments as the raw materials. Instead, the primary goal has been to permanently immobilize the particles of primary pigments and extenders relative to each other to prevent a detrimental separation (fractionation) of the pigmentary components according to species and size in the subsequent end-use applications. The second attempted goal was to obtain an optimum spacing between the immobilized $TiO_2$ particles equal to about one half of an "average" light wavelength with the aid of commercial extender pigments. As is now well understood in the trade, however, the above doctrine was a misconception, the dimensional considerations clearly revealing that a true interspacing of $TiO_2$ particles with the incomparably coarser particles of the commercial extender pigments is physically impossible.

As is now also well known in the art, a great deal of detrimental (uncontrolled) aggregation of pigment particles, particularly $TiO_2$, was unavoidable during the synthesis of the prior-art composite pigments under discussion. Since the prevailing doctrines in the art postulate that all $TiO_2$ particles must be separated from each other by an optimal distance to obtain the highest possible optical-performance efficacy, an aggregation of $TiO_2$ particles being tantamount to a technological anathema, it is not surprising that the inventors of $TiO_2$-based composite pigments have refrained from even mentioning, by name, the aggregation of pigmentary components in all respective patent descriptions known to the applicant.

While the concept of a mutual interspacing of particles of primary and secondary pigments has at least a nominal justification based on the consideration of the well-known laws of physical optics, a purposeful aggregation of low-refractive-index pigments by themselves had never been contemplated in the prior art, to the best of the applicant's knowledge, until after the phenomenon of beneficial in-situ aggregation of pigment fines, discovered by the applicant, was published in 1970. As a matter of fact, the iron-clad doctrine in the pigment science and technology of the prior art has always been that pigments must be optimally deaggregated and dispersed to yield the best optical and other performances.

According to the above-mentioned publication appearing in the *Journal of the Technical Association of the Pulp and Paper Industry* (TAPPI), Vol. 53, No. 11, November 1970, Pages 2077-2084 ("Performance of Some Commercial Clays in Starch-Containing Paper-Coating Films; Part I. Black Glass Plates as Model Substrates"), preceded by a presentation at the TAPPI Coating Conference held in Houston, Tex., May 3-4, 1970, the light-scattering properties of entire pigment populations can be improved by aggregating in situ pigment fines whose dimensions in a discrete state are too small for efficient light scattering. For example, the light-scattering performance at two different wavelengths (457 nm and 577 nm) for coating formulations prepared from three different clay products in films deposited on optically flat black glass plates as coating substrates was presented graphically as a function of the binder-volume fraction in FIGS. 6 and 7 of the above publication. The slopes of the curves representing the light-scattering coefficients of No. 1 and No. 2 clays as the function of the binder-volume content in the coating ascend initially with the increasing binder-volume fraction and, after reaching the maximum value at a binder-volume fraction corresponding to about 5 parts of starch per 100 parts of clay, by weight, descend as the binder-level is further increased.

This initial increase of light-scattering coefficients is explained in the above publication "...by an aggregation of clay fines effected by the initial addition of binder. The aggregates of ultrafine particles, which are understood here as assemblies of a very few such particles, should scatter the light more effectively than the individual components." The subsequent steady decline of the magnitude of the light-scattering coefficients is explained as follows: "An increase of the binder content of the coating systems beyond the $F_{bv}$ (binder volume fraction—explanation added by the applicant) value of 0.080 (5 parts starch per 100 parts clay, by weight) appears to cause a further growth of the assemblies of pigment particles, so that the optimum dimensions of the light-scattering sites are exceeded." With the relatively coarse mechanically delaminated clay having only minor proportions of particles smaller than 0.1-0.2 $\mu$m, e.s.d., the light-scattering efficacy of the coatings declined from the very first incremental addition of the binder because of the scarcity of ultrafine particles amenable to a beneficial aggregation.

The relatively coarser intrinsic structure of the coating films containing the mechanically delaminated clay, compared to those containing No. 1 and No. 2 clays, was verified with the aid of a new empirical parameter, called "Rho" (after the Greek letter $\rho$), defined in the above publication as the ratio of the numerical values of the light-scattering coefficients assessed at 577 nm and 457 nm for the same coating film. With coating films having a relatively fine intrinsic structure, such as binderless coatings or coatings with a low binder-volume fraction, the magnitudes of the corresponding "Rho" parameters are low. As the intrinsic coating structure becomes coarser, as was the case with all coatings discussed in the above publication in which the binder content was continuously increased, the magnitude of "Rho" increases accordingly. Below a certain specific binder-volume concentration (about 5-8%, by weight), the coarsening of the coating structure is beneficial; hence, an increasing Rho value is associated with the increase of the light-scattering coefficients. Above this specific binder-volume concentration, however, the coarsening in question becomes excessive, the increasing Rho value being associated with a decrease of the light-scattering coefficients.

As is evident from the above considerations, the light-scattering efficacy of both high- and low-refractive-index pigments can be significantly improved by a purposeful, in-situ aggregation of pigment fines. The publication by Kaliski (*TAPPI Journal*, Vol. 53, No. 11, November 1970, Pages 2077-2084) thus provided the scientific foundation for an entirely new pigment technology, opening the way to designing and manufacturing new lines of pigment products with an improved optical performance.

Indeed, the first patent pertaining to the manufacture of an aggregate pigment with improved optical properties, made of a single, low-refractive-index pigmentary raw material, namely, U.S. Pat. No. 4,075,030 ("High Bulking Clay Pigments and Methods for Making the Same"), was issued to Bundy et al. in 1978. According to this patent, a fine-particle-size kaolin clay, also containing 0.1-0.7% platy mica with a diameter below 100 $\mu$m (passing through a 150-mesh screen) as an auxiliary material, was treated with ethylenediamine and citric acid and then flocculated with sulfuric acid. After filtration and rinsing, the resultant filter cake was dried at 65° C. The improved optical performance of the resultant pigment product was explained speculatively in terms of incorporation of voids "...to form a high bulking clay." However, the contribution of the "voids" in question to the improved optical performance of the high-bulking pigment product under discussion was not documented by Bundy et al. with any experimental data.

As is readily understood by those skilled in the art, the colloid-chemical action of the above-mentioned reagents leads to the flocculation of the slurry of the clay raw material employed, resulting in the formation of essentially only two types of aggregates: the first type consists of clay fines alone, clustered together by themselves; the second type consists of discrete (individual) clay fines and/or small clusters of such fines attached to the coarser kaolin platelets. However, as is well known to those skilled in the art, the flocculating system employed by Bundy et al. is quite inefficient, necessitating that its action be enhanced with the aid of the coarse mica platelets. That platy mica particles, with diameters of up to 100 $\mu$m, do indeed enhance the flocculation of the much finer clay pigment employed in U.S. Pat. No. 4,075,030 (96.4% finer than 2 $\mu$m according to the Example I therein) shall be made clear from the considerations to follow.

The enhanced flocculation of small particles in the presence of coarser ones is well known in the art, being first described by V. D. Samygin et al. in the article titled "Mechanism of Mutual Flocculation of Particles Differing in Size" (translated from *Kolloidnyi Zhurnal*, Vol. 30, No. 4, pp. 581-586, July-August, 1968), dealing with flocculation phenomena in flotation processes. According to the above article, the rate of adhesion of fine particles to coarser ones may be higher by a factor of $10^3$-$10^4$ than the rate of cohesion between finer particles.

An analysis of the functional aspects of the above-mentioned "high bulking clay pigments" clearly points to the lack of a viable adhesive (cementing) mechanism capable of providing an adequate level of mechanical integrity to the individual pigment aggregates. As a consequence, the aggregates break down under high-shearing conditions encountered routinely during the makedown of pigment slurries or high-speed blade-coating, the enhanced optical-performance efficacy acquired through aggregation being strongly reduced. It is worth noting in the above context that, as documented amply by industrial experience, imparting an adequate mechanical integrity to the aggregate pigments while simultaneously generating in a controlled manner beneficial aggregate pigment structures has never been accomplished satisfactorily in the entire technology of the aggregate pigments of the prior art.

It should also be pointed out that the term "high bulking" is used incorrectly with the aggregate pigment disclosed in U.S. Pat. No. 4,075,030 as well as in other similar disclosures to be discussed hereinafter. Traditionally, the term "bulking" has been applied only to thixotropic pigments, e.g., satin white, which have shear-thinning properties. Hence, satin-white containing coating formulations applied to a web of paper with the aid of a doctor blade become very fluid in the high-shear zone under the blade but set immediately after emerging from that zone. As a consequence, the freshly applied coating films resist the shrinking (compaction) caused by the dewatering process and, at the same coating weight, are thicker (more bulky) than analogous films formed from non-thixotropic coating formulations. In terms of additional benefits, the thixotropic, rapidly setting coating films are mottle-free, the detrimental binder migration being more or less completely eliminated. The common feature of all true bulking (thixotropic) pigments is that their aqueous slurries gel readily and do not settle, or settle only partially, forming very soft, "bulky" sediments.

In contrast, the aqueous slurries of aggregate pigments of the prior art, including slurries of thermally aggregated (by sintering) calcined clays, do not gel, forming instead rock-hard sediments upon settling. Although the latter pigments do indeed provide some limited "bulking" action, they do so solely by virtue of flow hindrance induced by dilatancy rather than by thixotropic setting. Because of this dilatancy, the flow of freshly applied coating films containing the flow-hindering pigments is hampered momentarily so that a thermal setting, induced by drying, can take effect before a major disarrangement of the coating-film structure occurs. However, the latter pigments are not even nearly as effective in preventing the detrimental binder migration as the thixotropic bulking pigments.

Aggregate pigments virtually identical to those of Bundy et al., except for the cementing medium employed, were disclosed in WO 87/00544 to Jones et al. Called "structured kaolin pigments," with the emphasis being placed on structure rather than aggregation, the latter are manufactured in a "dry state" by saturating a fine-particle-size kaolin clay with metal chlorides, e.g., silicon tetrachloride, which are then hydrolyzed in situ and converted into cements bonding the pigment fines to each other and to the coarser clay platelets. The optical-performance efficacy of these pigments, made from fine-particle-size kaolin clay raw materials, is essentially identical to that of analogous pigments disclosed by Bundy et al. Although the mechanical integrity of the structured kaolin pigments made in accordance with WO 87/00544 is higher than that of the pigments disclosed by Bundy et al., the approach used by Jones et al. makes it inherently difficult to generate in situ sufficiently high levels of cement needed for a truly adequate mechanical strength of the resultant pigment aggregates.

As is understood by those skilled in the art, other approaches already employed in synthesizing $TiO_2$- or ZnS-containing composite pigments of the prior art are also applicable to synthesizing aggregate pigments made solely of low-refractive-index pigmentary raw materials. One such viable approach, for example, was disclosed in U.S. Pat. No. 2,176,876 to Alessandroni. In accordance with the latter, an anionically dispersed slurry of a low-refractive-index pigmentary raw material is flocculated with the aid of a cationic agent. Although not taken into consideration by Alessandroni, some beneficial in-situ aggregation of pigment fines present in the system is inescapable due to the above-mentioned flocculation.

The inherent difficulty of the above-mentioned approach is, however, that the initial increments of cationic flocculants introduced into the pigment furnish induce an excessive local flocculation of particulate matter, inhibiting a uniform mechanical distribution of the remaining portion of the flocculant throughout the furnish. It is thus impossible to always synthesize an identical pigment product since even moderate differences in raw material properties, such as may be brought about by a mere change of the mining location of a kaolin-clay crude, strongly affect the flocculation kinetics of the furnish, notoriously causing major variations in the end-use properties of the resultant aggregate pigment products.

Other potential approaches applicable to the manufacture of aggregate pigments can be patterned on a modification of the spray-drying or freeze-drying approaches suggested by Fadner in U.S. Pat. No. 3,453,131. The modification in question relies upon adding suitable polymer-emulsion adhesives to pigment furnishes to be submitted to spray-drying or freeze-drying.

As is readily understood by those skilled in the art, the three key processing elements indispensable to a successful synthesis of aggregate pigments of any type, regardless of the method employed, are as follows:

(a) Inducing a statistically uniform spatial distribution of all particulates present in a well-dispersed composite pigment furnish (slurry of pigmentary raw materials), using the best available dispersants and adequate agitation regimes.

(b) Instantly "freezing" the statistically uniform spatial distribution induced in (a), to ensure an equivalent statistically uniform distribution of particulate components in the resultant composite pigment products.

(c) Imparting an adequate mechanical integrity to the resultant pigment aggregates to enable the composite pigment products to withstand the shearing regimes to which they may be exposed in the customary handling and end-use applications.

It should be borne in mind, however, that a truly optimal pigment dispersion, such as is indispensable for generating a statistically uniform spatial distribution of all particulates in the furnish in accordance with requirement (a) can be obtained only with a single monodisperse particulate species. In a slurry of a polydisperse pigment, for example, one can distinguish three classes of particulates which differ considerably with regard to colloidal behavior, namely, the fine fraction encompassing pigment fines with particles smaller than 0.15–0.2 $\mu$m e.s.d.; the intermediate fraction encompassing particles with equivalent spherical diameters ranging from about 0.2 $\mu$m to about 0.5–0.7 $\mu$m; and the remaining "coarse" fraction. Although the commercial slurries of polydisperse pigments (no commercial monodisperse pigments have ever been offered on the market) are commonly referred to in the art as being "optimally" dispersed, in reality each individual size fraction is characterized by an inherently different state of dispersion and thus also by a different dispersion stability and resistance to flocculation.

The overall colloidal picture becomes yet more complicated with pigment dispersions that are both polydisperse and hetero-disperse (consisting of two or more pigment species), such as are used for the synthesis of composite pigments. As is well known in the art, it is fundamentally impossible to obtain an "optimal" dispersion of such composite slurries in that each individual pigment fraction and species has a different optimum dispersant demand, both quantitatively and qualitatively, and a different equilibrium between the dispersant adsorbed on the pigment and dissolved in the carrier medium (water). Hence, even if optimally dispersed slurries of individual pigment species were prepared separately and then blended, a progressive destabilization of the dispersion of the resultant composite slurry would commence immediately. As a consequence, a separation (fractionation) and selective flocculation of the polydisperse and heterodisperse phases according to species and size would immediately set in, starting with the relatively least stable disperse fraction and progressing toward the relatively more stable ones. As a matter of fact, the better the initial dispersion of a composite pigment slurry, the more pronounced become the phenomena of fractionation and selective flocculation when the slow and inefficient flocculation processes of the prior art are employed in the synthesis of composite pigments.

It is thus obvious from the above considerations that composite pigments are considerably more difficult to synthesize than those consisting of a single pigmentary species. For the best possible end results, it is virtually mandatory to first start with optimally dispersed, separately prepared, raw material slurries, blend these slurries within the shortest possible time interval at the highest practical solids, using a vigorous agitation, dilute the resultant pigment furnish to the solids level called for by the synthesis procedure, and then instantly flocculate the furnish to "freeze" the dynamically maintained uniform spatial distribution of all particulates present in the furnish before a detrimental fractionation and selective flocculation of the particulates can set in.

As is readily understood, the cementing (adhesive) medium needed to impart the desirable level of mechanical strength to the resultant pigment aggregates must either be already present in the pigment furnish or be synthesized in situ, regardless of whether the aggregate pigment is synthesized from a single or multiple raw material species.

It should be pointed out in the above context that a successful process scheme for synthesizing aggregate pigments, encompassing all three above-mentioned key elements, was never fully realized in the prior art, as shall become clear from the considerations to follow.

Firstly, while the state of an optimal (for all practical purposes) dispersion is clearly indispensable to attaining a uniform spatial distribution of all particulate components present in a disperse system, the flocculating agents and processes of the prior art are incapable of completely overriding the action of the powerful modern dispersants.

Secondly, because of the detrimental progressive destabilization of composite slurries, the total homogenization of all particulate components in pigment furnishes used for synthesizing composite pigments should be accomplished very rapidly, preferably within an interval shorter than 2-5 minutes. The latter requires, however, that the homogenization be carried out at the highest attainable solids, such as can be handled only with the aid of advanced powerful in-line mixers. Powerful mixers are also indispensable to speedily carry out the dilution of the furnish in that the dispersion stability of diluted slurries deteriorates much faster than that of high-solids ones.

Thirdly, a continuous introduction (metering) of the flocculating agents into the diluted pigment furnish is virtually mandatory. The use of batch processes, such as are commonly employed in the manufacture of pigments in accordance with the prior art, will invariably result in synthesizing non-uniform, non-reproducible inferior end products.

Fourthly, the kinetics of the flocculation process employed must be instantaneous, for all practical purposes. With a non-instantaneous process, of course, the particulates present in the furnish will flocculate sequentially, the least stable fractions being the first ones to be flocculated. Furthermore, the flocculation mechanism must also be indiscriminate, i.e., unaffected by either the physical, chemical or colloidal makeup of the disperse phases present in the furnish. As is rather obvious, a discriminatory flocculation mechanism would invariably lead to a detrimental selective flocculation of the particulates according to species and size. The flocculation must also be complete, manifested by a clear separation of the flocculated phase from a clear supernatant.

As is well known by those skilled in the art, a flocculation process having all the above-mentioned attributes was unknown in the prior art before it was first disclosed in U.S. Pat. No. 5,116,418 issued May 26, 1992 and the co-pending patent application Ser. No. 07/919,831 ("Functional Complex Microgels with Rapid Formation Kinetics"), Filed Jul. 27, 1992 now abandoned, both above applications being incorporated herein by reference.

As is readily understood, the above instantaneous, indiscriminate and complete flocculation process, combined with the intrinsic cementing mechanism, makes it possible to synthesize countless numbers of aggregate pigments from a wide variety of pigmentary, subpigmentary and nonpigmentary raw materials. As a consequence, the novel aggregate pigments of the present invention provide not only an improved optical performance (the primary goal of all analogous aggregate pigment products known in the prior art), but also extend into the hitherto untapped domain of functional pigments. The latter functional pigments are designed to provide a variety of novel material as well as performance properties, such as reduced fiber debonding and increased first-pass retention in paper-filling applications, intrinsic pitch-combating ability, reduced abrasivity, paper-coloring ability, shear-thinning (thixotropy) of coating colors in high-speed coating applications, or affinity to (compatibility with) organic media.

It should be emphasized strongly herein that all composite pigments known in the prior art consisted of high-refractive-index primary pigments, such as $TiO_2$ or ZnS, in blends with low-refractive-index secondary (extender) pigments, but none was known consisting solely of blends of low-refractive-index particulate components, such as those synthesized in accordance with the present invention. It should be emphasized also that, to the best of the applicant's knowledge, all aggregate pigments of the prior art, regardless of the composition or type, were intended exclusively for the improvement of optical-performance efficacy, aggregate pigments intended for improved or novel functional properties being unknown heretofore.

In accordance with the foregoing and disclosures to follow, it is an object of the present invention to provide compositions for novel aggregate pigment products made of raw materials encompassing solely low-refractive-index inorganic and/or organic pigments, subpigmentary mineral particulates, and non-pigmentary particulate and/or water-soluble materials.

In particular, it is an object of the invention to provide compositions for aggregate pigment products synthesized by the general method disclosed in the previously mentioned U.S. Pat. No. 5,116,418 to.

It is a further object of the invention to provide compositions for aggregate pigment products synthesized from virtually all low-refractive-index pigmentary raw materials applicable to paper making and having a higher optical-performance efficacy and lower abrasivity than the individual materials employed for their synthesis.

It is a yet further object of the invention to provide compositions for aggregate pigment products which, regardless of their predominant kaolin-clay or calcined-clay content, are uniquely suitable for use in the alkaline papermaking process.

It is a still further object of the invention to provide compositions for aggregate pigment products with improved optical-performance efficacy and extra-high bulking properties, synthesized from commercial precipitated pigmentary raw materials deagglomerated mechanically to a subpigmentary particle size, used alone or in blends with pigmentary raw materials and/or other constituents.

It is a yet further object of the invention to provide compositions for aggregate pigment products having intrinsic pitch-combating properties in papermaking furnishes.

It is a yet further object of the invention to provide compositions for aggregate pigment products containing, in addition to pigmentary and/or subpigmentary and other constituents, water-soluble and/or disperse polymer adhesives to reduce fiber debonding in paper-filling applications and improve solvent dissipation in printing.

It is a still further object of the invention to provide compositions for aggregate pigment products for paper-coating applications containing, in addition to pigmentary and/or subpigmentary and other constituents, non-film-forming organic-polymer particulates for improved ink receptivity.

It is a yet further object of the invention to provide compositions for aggregate pigment products for newsprint-filling applications containing, in addition to pigmentary and/or subpigmentary and other constituents, high-surface-area, high-oil-absorption pigmentary raw materials for both improved ink absorbency and immobilization.

It is a yet further object of the invention to provide compositions for extra-high-opacifying aggregate pigment products containing intrinsically dispersed carbon black, thus rendering them particularly suitable for the manufacture of lightweight newsprint and groundwood specialty papers.

It is a still further object of the invention to provide compositions for aggregate pigment products containing intrinsically incorporated color dyes to eliminate the residual yellow hue, inherent to virtually all commercial pigments, and/or render the resultant aggregate pigment products directly applicable to the coloring of paper, paints and the like.

It is a yet further object of the invention to provide compositions for aggregate pigment products containing chemically built-in organic, cationically active compounds with at least two reactive groups in each molecule to impart controlled levels of oleophilic properties to the resultant pigment products, thus rendering them uniquely compatible with, and dispersible in, organic media such as plastics, synthetic fibers and solvent-based lacquers and paints.

It is a yet further object of the invention to provide compositions for aggregate pigment products containing cellulosic and/or synthetic microfibrils to maximize first-pass retention and decrease fiber debonding in paper-filling applications, especially high-ash applications.

A yet further object of the invention is to provide compositions for aggregate pigment products in which the particulate ingredients are coflocculated in a controlled manner into aggregates whose intrinsic structure, as well as spatial distribution of the light-scattering and functional sites, provides an overall performance efficacy of the resultant products that is superior, in terms of the light-scattering efficacy, functional properties and economy of use, to that of the equivalent blends of loose ingredients.

It is also a particularly special object of the invention to provide general principles of qualitative, quantitative and functional formulating of the ingredients of aggregate pigments as well as principles of inducing intrinsic, optically favorable spatial and structural configurations, enabling one to design at will aggregate pigment products suited for the specific needs and preferences of individual customers.

SUMMARY OF THE INVENTION

The present invention relates to novel aggregate pigment products comprising up to 99.5%, by weight, of at least one low-refractive-index particulate species and from 0.5% to 10%, by weight, as determined by ashing, of an in-situ synthesized complex functional calcium-alumino-silicate or similar microgel, further in the specification and in the claims to follow referred to in generic terms, regardless of the detailed chemical composition, as complex functional microgels, optionally including at least one of the following additional materials:

(a) from 0.5% to 99.5%, by weight, of at least one mineral low-refractive-index subpigmentary material for optical purposes;

(b) from 0.5% to 5%, by weight, of at least one mineral subpigmentary material for functional purposes;

(c) from 0.5% to 25%, by weight, of at least one high-oil-absorption particulate material with a specific surface area larger than 100 $m^2/g$;

(d) from 0.5% to 20%, by weight, of at least one organic, pigmentary non-film-forming material;

(e) from 0.25% to 5%, by weight, of at least one organic, subpigmentary non-film-forming material;

(f) from 0.25% to 5%, by weight, of at least one polymer-emulsion adhesive;

(g) from 0.25% to 5%, by weight, of at least one water-soluble polymer adhesive;

(h) from 0.001% to 0.5%, by weight, of at least one organic, cationically active compound with at least two reactive groups in each molecule;

(i) from 0.005% to 5%, by weight, of at least one color dye;

(j) from 0.005% to 0.15%, by weight, of carbon black; and (k) from 0.1% to 2%, by weight, of synthetic and/or cellulosic microfibrils.

DESCRIPTION OF THE PREFERRED EMBODIMENTS

In the preferred mode of practicing the present invention, novel aggregate pigment products for paper, paint and plastic applications are manufactured from single and multiple species of low-refractive-index pigmentary and/or subpigmentary materials combined with auxiliary (functional) particulate and/or soluble nonpigmentary materials, coflocculated and cemented intrinsically with the aid of the in-situ synthesized complex functional microgel cements.

The preferred process for the manufacture of the aggregate pigment products of the present invention is based on an instantaneous, indiscriminate and complete coflocculation of the pigmentary, subpigmentary and nonpigmentary raw materials, dispersed (dissolved) in aqueous media with the aid of the in-situ synthesized complex (multicomponent) function microgels disclosed in the previously cited U.S. Pat. No. 5,116,418, and the co-pending patent application Ser. No. 07/919,831 ("Functional Complex Microgels with Rapid Formation Kinetics"), Filed Jul. 27, 1992 now abandoned.

The above complex microgels are formed in two distinct stages, a different polymerization mechanism being active in each stage.

In the first process stage, two separate reagent solutions are introduced into the aqueous furnish comprising particulate and/or soluble, pigmentary and/or non-pigmentary materials. One of these reagent solutions contains an alkali-metal, or quaternary ammonium silicate, preferably sodium silicate. The other solution contains an alkali-metal aluminate and/or alkali-metal zincate, preferably sodium aluminate. An immediately commencing addition polymerization of the above "primary" subcolloidal-hydrosols-forming reagents leads to the formation of sodium-silico-aluminate (zincate) dimers, trimers and higher-rank oligomers. These transient, chemically reactive anionic polymer precursors remain, for a limited period, in a very specific state of solution, for which the objectively fitting term "subcolloidal hydrosols" is being employed herein.

In the second process stage, an aqueous solution containing at least one cross-linking agent selected from the group consisting of essentially colorless, bivalent and/or multivalent salts of calcium, magnesium, barium, aluminum, zinc and zirconium, preferably calcium chloride or nitrate, is introduced into the above-mentioned furnish containing the subcolloidal hydrosol formed in the first process stage. The polycondensation reaction taking place between the transient, chemically reactive subcolloidal sodium-silico-aluminate (zincate) hydrosols and the inorganic cross-linking salts leads to an ultrarapid formation of complex (multicomponent) calcium-silico-aluminate (zincate) or similar microgels, made up of networks of macromolecules of a polymer-polycondensate type. The colloidal consequences of the in-situ (in the furnish) formation of these complex microgels are an instantaneous, indiscriminate and complete flocculation (coflocculation) of any and all particulates present in the furnish in question.

It should be emphasized that the primary reagents used in the first stage of the process of the formation of the complex microgels, i.e., sodium silicate and sodium aluminate (zincate), must first react with each other to form the transient, chemically reactive subcolloidal sodium-silico-aluminate (zincate) hydrosols before any complex microgels can be formed (in the second stage of the process) by cross-linking these subcolloidal hydrosols with bivalent or multivalent inorganic salts. Hence, the subcolloidal sodium-silico-aluminate (zincate) hydrosols which, along with the inorganic cross-linking salts, are the factual microgel-forming agents, must be considered as "higher-rank" reagents synthesized in situ from the primary reagents, i.e., sodium silicate and sodium aluminate (zincate). If the latter individual reagents reacted directly (on their own) with a cross-linking salt, e.g., calcium chloride, the products of such reactions would be merely suspensions, or precipitates, of solid, more or less crystalline particles of calcium silicate and calcium aluminate (zincate), respectively, but not microgels, let alone complex microgels which, by definition, must contain at least three different building blocks in their macromolecular make-up.

The complex functional microgels used in practicing the present invention are formed in a virtually instantaneous manner. It is estimated that the chemical reaction of polycondensation between the low-molecular-weight, subcolloidal hydrosols mentioned previously and the bivalent and multivalent inorganic salts is completed in less than one microsecond. The consequences of this polycondensation are further manifested in a very rapid propagation of association between calcium-silico-aluminate (polymer-polycondensate) macromolecules, bringing about, within a couple of milliseconds, the development of colloidal formations with molecular weights that may reach billions. It is primarily this rapid continuous growth ("sweep") of the molecular weights across such an enormously broad range which is deemed responsible for the instantaneous, indiscriminate and complete flocculation of even the most heterodisperse and polydisperse colloidal systems known in the art, regardless of these systems' physical, chemical or colloidal make-up.

While the complex (multicomponent) microgels used in practicing the present invention were unknown heretofore, the transient, chemically reactive subcolloidal hydrosols employed in the synthesis of these microgels need some elaboration to distinguish them from other, seemingly analogous systems of the prior art. In view of the confusion and lack of standardization in the present colloid-chemical terminology, a fundamental treatment of the subject matter of the present invention and a brief chronological review of the prior art pertaining to this subject matter is deemed necessary.

It is essential to point out that the era of an intense worldwide interest in natural and synthetic silica and silico-aluminate materials has commenced with the key discoveries of 1) water-soluble sodium silicates ("water glass") by Johann Nepomuk von Fuchs (1774-1856), who also suggested numerous practical applications for these interesting chemicals, encompassing adhesives, cements, flame retardants for paints, detergents, soap builders, dyeing adjuvants, metal fluxes and fertilizers;

2) metallic aluminum in 1825 by Oerstedt and Woehler, with most of the inorganic chemical compounds of this element known today having been described in the professional literature by countless scientists within the next few decades; and 3) ion-exchange properties of soils, which are natural alumino-silicates, by J. T. Way in 1850.

The rapidly following discoveries of many other commercially valuable properties of silica and alumino-silicate minerals, e.g., in the application to the desiccation of gases, clarification of water, removal of color impurities from edible and mineral oils, or manufacture of pigments and catalysts, triggered intensive research efforts in the field of silica and alumino-silicates. These efforts were directed both towards improving the performance properties of naturally occurring materials as well as producing analogous or yet unknown synthetic materials with yet more improved or even entirely novel properties.

Due to the similar dimensions of ionic radii of $Si^{4+}$ and $Al^{3+}$ (0.41 Å and 0.50 Å, respectively), as well as an overwhelming abundance of these two elements in the lithosphere, countless forms of alumino-silicate minerals have been synthesized in nature by geochemical processes. The potential number of synthetic alumino-silicates, on the other hand, is virtually unlimited. That such an enormous variety of chemical compounds, characterized by distinct physical and colloid-chemical properties, can be synthesized using just one or two of the four simple, easily available reagents, i.e., sodium silicate, silicic acid, sodium aluminate and alum, has no precedent in the inorganic chemistry.

Thousands of patents issued in the past 150 years for synthetic silica and alumino-silicate products obtained with the aid of the above-mentioned reagents relate essentially to only three principal colloidal systems, namely, gels, sols and precipitates. The incredible diversification of the forms and properties of products synthesized with the aid of the same few reagents may be explained by accepting the hypothesis that colloids are the lowest-rank systems known in nature equipped with "memory." It is the latter which makes the colloids "remember" their history in chronological detail and react accordingly, as manifested in terms of their resultant material properties and functional behavior. Hence, any intentional or accidental deviation from the established synthesis procedures, or reaction conditions, will bring about inescapably certain differences, mostly quantitative but sometimes profoundly qualitative, in the constitution and/or functional properties of the resultant colloidal systems. Indeed, the thousands of similar, or even virtually identical, patented synthetic silica and alumino-silicate products differ among each other merely with respect to relatively minor quantitative compositional variations, procedural modifications in their synthesis (such as pertain to concentrations and orders of addition of reagents, pH ranges, temperature conditions and aging regimes), modified physical properties and new areas of application.

How even a seemingly minor processing detail may be decisive to the very usefulness of a synthetic alumino-silicate product may be illustrated, for example, by U.S. Pat. No. 2,757,085 to Paquin. As disclosed therein, satisfactory color-reactive alumino-silicate pigments, synthesized in situ in a papermaking furnish, could be obtained only if sodium aluminate was introduced into the furnish first, followed by the addition of sodium silicate, but not vice-versa. Similarly, U.S. Pat. No. 4,213,874 to Williams et al. teaches that satisfactory amorphous sodium aluminosilicate base exchange materials could be synthesized only if, among other things, the proper sequence and rate of addition of the reactants were maintained during the precipitation process.

The critical dependence of a successful preparation of colloidal systems on maintaining strictly defined process parameters and conditions is perhaps best summarized by S. Voyutsky in his textbook of COLLOID CHEMISTRY (Page 269, second paragraph), Mir Publishers, Moscow, translated into English in 1978: "Colloidal systems can be obtained by various chemical reactions: exchange, reduction, oxidation, hydrolysis, and so forth. But colloidal systems are not always formed in reactions capable of producing sols; they are formed only (underlining added by the applicant) at definite concentrations of the initial substances, at definite order of their mixing and temperature, and when some other conditions are met."

The preferred transient, chemically reactive subcolloidal hydrosols used in practicing the present invention are soluble sodium-silico-aluminates, synthesized upon the introduction of solutions of sodium silicate and sodium aluminate into the slurries of particulate raw materials ("furnishes") used for the manufacture of the composite pigments under discussion. As the result of an addition polymerization between the above-mentioned reagents, dimers, trimers and higher-rank oligomers evolve sequentially and continuously into very-low-molecular-weight sodium-silico-aluminate macromolecules of an anionic polyelectrolyte type. Because of the relatively low concentrations of the reagents employed, but mostly due to the prompt utilization of the transient subcolloidal hydrosols in question, the evolving sodium-silico-aluminate macromolecules are very small, their dimensions being estimated to be only slightly larger than 1 nm.

Such highly disperse systems represent special borderline solutions classified dimensionally above solutions of crystalloids (simple molecules or ions), but below colloidal solutions, e.g., those of starch, protein or polyacrylamide. A scientifically appropriate term "subcolloidal hydrosols" has been systematically used henceforth in referring to these systems, which should be distinguished from aquasols (hydrosols) of the prior art which are aqueous suspensions of solid particles with dimensions ranging from about 5 nm to 100-200 nm in diameter.

Historically, the terminology used in colloid chemistry has been developed in connection with the basic investigative tools available at the inception of the branch of science in question, namely, the conventional light microscope and ultramicroscope. The old-fashioned light microscopes equipped with low-aperture objectives made resolving particles smaller than 200 nm in diameter hardly possible; hence, such particles were referred to as "submicroscopic." On the other hand, ultramicroscopes, utilizing the Tyndall effect, made it possible to observe, though not resolve, particles as small as 5 nm in diameter. Hence, colloidal systems became traditionally the domain of ultramicroscopical investigations and their classification as "ultramicroscopic," with particle dimensions ranging from 5 nm to 200 nm, still has a great deal of validity for most practical applications. Regrettably, some less rigorous colloid textbooks still routinely list the colloidal dimensions as extending from 1 nm to 500 nm, or even 1 $\mu$m.

Modern scientific research has established unequivocally, however, that the traditional delineation between "colloidal" and "non-colloidal" (crystalloid) systems, established solely on the basis of the dimensions of particles of the disperse phase, has no scientific foundation. Hence, contemporary scientific doctrines refute the concept of "colloids" and "crystalloids," interpreted in the past in a rather absolute sense, accepting instead the existence of a very specific "colloidal state" associated with disperse systems conforming to the established criteria of "colloid-like" behavior. The reasons for this can be illustrated rather clearly using the example of sodium chloride, which behaves as a typical crystalloid in aqueous solutions and a typical colloid in benzene solutions, countless other such systems already having been identified.

Many experimental findings made during studies of extremely disperse systems attest particularly clearly to the uniqueness of the particle-dimension interval extending from 1 nm to 5 nm, in which the colloidal and crystalloid states overlap and deficiencies of the imperfect colloid-chemical nomenclature are most evident. Hence, an unambiguous treatment of disperse systems of the above type frequently makes defining them in fundamental terms virtually mandatory, as has been established in dealing with many extremely important media such as surfactants, dyes, toxins and antitoxins. For example, the dimensions of individual molecules of some of the above-mentioned materials are larger than 1 nm (10 Å), considered as the conventional upper limit of crystalloid particles, but smaller than 5 nm (50 Å), considered as a practical lower limit for typical colloidal particles. Since the behavior of such systems overlaps the domains of both crystalloids and colloids, some authors have introduced the rather artificial term "semicolloids" to deal with these unusual solutions. Still other authors refer to such highly disperse systems, with particle dimensions ranging from 1 nm to 5 nm, as "amicrons" (subcolloids), as distinguished from "submicrons," applying to systems with particles larger than 5 nm in diameter.

Perhaps the most unfortunate aspect of colloid-chemical terminology is that the term "aquasol," and the equivalent term "hydrosol," in which the suffix "sol" stands for "solution," are used in referring to suspensions of ultramicroscopic solid particles in water. Although aquasols (hydrosols) do indeed appear as translucent (opalescent) solutions to an unaided eye, the latter, fundamentally incorrect, terms complicate the clarity of the issue when the scientific discourse revolves around systems of overlapping behavior (e.g., crystalloid/subcolloid or subcolloid/colloid) or extends beyond professional circles. It should be pointed out, though, that many rigorous colloid scientists systematically employ the scientifically correct term "suspensoids" in referring to aquasols (hydrosols) of the prior art.

The above-mentioned, nomenclature-related problems become yet more complicated in dealing with novel subject matter, such as the subcolloidal sodium-silico-aluminate or similar hydrosols used in synthesizing the complex microgels at the foundation of the present invention. The latter subcolloidal hydrosols constitute borderline solutions of transient, chemically reactive polyanionic molecules. As solutions, they have the appearance of completely clear, plain water, are totally devoid of any solid particles and do not exhibit the Tyndall effect.

The transient character of these continuously changing subcolloidal sodium-silico-aluminate and similar hydrosols renders the underlying oligomers and macromolecules fundamentally undefinable in terms of the exact physical dimensions or chemical compositions. This is readily understood considering that the reaction of addition polymerization, commencing with the moment the solutions of sodium silicate and sodium aluminate become introduced into the reaction space, proceeds continuously. Hence, even if there were a method capable of determining, at any given instant, the dimensions, molecular weights, or chemical compositions of the evolving macromolecules, such information would become obsolete in the very subsequent instant.

It is possible, however, to objectively define the unique systems mentioned above using the criteria of the philosophy of science. According to the latter criteria, the continuously changing, transient subcolloidal hydrosols cannot be classified as "materials" in a conventional sense in that they have no definite form, mass or properties by which a material is conventionally described or defined, e.g., in textbooks of material science. Instead, the latter subcolloidal hydrosols, representing a very specific "material state," are defined in terms of (a) detailed description of the reaction medium and conditions at the onset of the synthesis of the hydrosols in question, i.e., at the point of time (t) where t=0; and (b) an arbitrary subsequent point of time (t=x). The latter means that if the in-situ synthesis of an arbitrary transient subcolloidal hydrosol is initiated at a time t=0, using identical reagents, reagent proportions and concentrations, temperature, pH and all other effective reaction conditions and process parameters, then, and only then, the resultant transient subcolloidal hydrosol will be exactly the same each time when passing through a subsequent fixed point of time t=c (x=c).

While the above-discussed, continuously evolving (in statu nascendi) systems, e.g., sodium-silico-aluminates, are undefinable in conventional (material) terms, it is also completely certain that they are different from any existing natural or synthetic substances of the same nominal chemical compositions. By contrast, all sols of the prior art are classified as "phaseal" colloids, the latter term indicating that the disperse phase is identical to an analogous phase existing on a macro scale and, in principle, could be obtained from the latter with the aid of mechanical comminution or other preparatory methods.

The transient aspects of the subcolloidal sodium-silico-aluminate hydrosols used in practicing the present invention must be particularly strongly emphasized since the process of addition polymerization between sodium silicate and sodium aluminate is a continuous one. Hence, at some advanced stage of polymerization (aging), particles of the above-mentioned subcolloidal hydrosols acquire sufficiently high molecular weights to exceed the solubility limits and transform into conventional aquasols, i.e., colloidal suspensions of solid particles. The period of aging necessary to initiate such a transformation may extend from less than a minute to several days, depending on the concentration of sodium silicate and sodium aluminate (zincate) in the reaction space, and is manifested by the appearance of the Tyndall effect.

As is understood by those skilled in the art, the chemical reactivity of the transient subcolloidal hydrosols in question, i.e., the ability to form complex microgels by a process of chemical cross-linking carried out with the aid of bivalent (multivalent) inorganic salts, decays with the increasing degree of polymerization (aging) and is lost almost completely when the solute particles transform into solid ones (such as are typical of conventional sols) after exceeding the solubility limits. It is important, therefore, that the second stage of the in-situ synthesis of complex microgels, in which the above-mentioned subcolloidal sodium-silico-aluminate or similar hydrosols are chemically cross-linked with the aid of bivalent and/or multivalent inorganic salts, be carried out before the advent of the Tyndall effect. In full-scale production-plant installations working in a continuous process mode, the above cross-linking is usually carried out within a period ranging from several seconds to a couple of minutes, counting from the moment the solutions of sodium silicate and sodium aluminate are introduced into the pigment furnish.

The primary purpose of the complex functional microgels under discussion is to induce an instantaneous, indiscriminate and complete flocculation (coflocculation) of all disperse raw materials present in the pigment furnish. Flocculation phenomena play a fundamental role in the manufacture of aggregate pigments by wet methods; however, the flocculation processes of the prior art are slow, selective (rather than indiscriminate) and incomplete. As a consequence, these processes are not well suited for the manufacture of aggregate pigments that are free of detrimental selective flocculation and fractionation of the disperse phases, by species and size, resulting in serious performance deficiencies of the end products. As a matter of fact, many water-based highly disperse colloidal systems cannot be flocculated (precipitated) at all with the use of the flocculating agents and processes known in the prior art. In the applicant's diversified experimentation, however, no water-based colloidal system has yet been encountered, regardless of how complex or difficult, able to resist the overpowering, instantaneous, indiscriminate and complete flocculating action of the in-situ-formed complex functional microgels used in practicing the present invention.

The secondary purpose of the complex functional microgels in question is to provide arbitrary levels of intrinsic cementation to pigment aggregates. Since the above complex microgels are outstanding hydraulic cements in their own right, adequate bonding between adjacent particles can be obtained by merely aging the flocculated slurries, or cakes obtained by filtering these slurries, for a period ranging from a couple of hours to a few days. An important additional benefit of hydraulic curing is that the final particle-size distributions, called for by product specifications, can be obtained readily with the aid of inexpensive high-shear agitation. With furnishes which, in addition to the principal pigmentary raw materials, contain also organic dyes, carbon black and/or organic, cationically active chemical compounds with two or more reactive groups in each molecule, the flocculated slurries usually require filtration, drying and pulverization to obtain both an adequate mechanical integrity of the resultant aggregates as well as the desired particle (aggregate)-size distribution.

The mechanical strength of the resultant pigment aggregates is controlled primarily by varying the dosage of the hydraulically or thermally cured microgel cements. The curing is both faster and more complete at higher drying temperatures; however, precautions must be taken if any temperature-sensitive organic components are built into the aggregate pigment. The mechanical strength of pigment aggregates can be yet further increased by coflocculating disperse and water-soluble polymer adhesives with the pigmentary raw materials, enabling the aggregates to withstand even the most stringent shearing regimes encountered in practical end-use applications.

It should be pointed out that the adhesive action of the complex microgels is possible only because the microgel particles, formed in situ under the application of very high shearing forces, are extremely small and have an inherent deformability (prior to being cured, of course), enabling them to orient themselves effectively in discrete, ultrathin formations embedded between the individual pigment particles to be cemented. As is obvious to those skilled in the art, only true microgel particles, but not solid aquasol particles or precipitates, are capable of such a deformation.

The tertiary purpose of the complex microgels in question is to impart various desirable material and functional properties to the aggregated and cemented pigment products, important from the standpoint of these products' end-use applications. The above effects can be realized through a modification of the inherent physical and/or surface-chemical properties of the above microgels, e.g., by chemically incorporating organic, cationically active compounds with at least two reactive groups in each molecule into the macromolecules which make up the microgels under discussion. As a consequence, a steric matrix of discrete organophilic (hydrophobic) sites can be imparted to aggregate pigments synthesized with the aid of the above complex microgels of a hybrid, inorganic/organic polymer-polycondensate type. By controlling, at will, the level of the organophilic (hydrophobic) properties, aggregate pigments can be formulated amenable to an easy and uniform dispersion in organic media, rendering these pigments uniquely suited for such applications as filling of synthetic fibers and plastics or the manufacture of solvent-based lacquers and paints.

The in-situ-synthesized complex functional microgels can also be used for an indirect modification of the functional and surface-chemical properties of the resultant aggregate pigments under discussion since they make it possible to coflocculate, along with pigmentary constituents, such potent surface-chemical modifiers in their own right as emulsion polymers or organic dyes.

The principal reagents of commercial significance for the synthesis of the complex (multicomponent) functional microgels used in practicing the present invention are as follows:

(1) alkali-metal silicates and quaternary ammonium silicates, preferably sodium silicate; (2) alkali-metal aluminates, alkali-metal zincates and blends thereof in any proportions, preferably sodium aluminate; and (3) water-soluble, essentially colorless, bivalent and multivalent salts of calcium, magnesium, barium, aluminum, zinc, and zirconium, preferably calcium chloride or calcium nitrate.

The pH of flocculated pigment furnishes ranges usually from 8 to 12.5, depending to a large extent on the initial acidity of the process water employed. The use of aluminum sulfate, alone or in a combination with calcium chloride and/or other equivalent cross-linking salts, may be advantageous in such instances in which it is desirable to lower the acidity of the flocculated pigment furnish. In addition to, or instead of aluminum sulfate, sulfuric acid and other common acidifying agents can also be used for the above purpose.

There is a great latitude with regard to the quantitative and qualitative compositions of the (intermediate) transient, chemically reactive, subcolloidal sodium-silico-aluminate or similar hydrosols and (final) complex microgels used in practicing the present invention, without detriment to their intended functions. For example, the acceptable ratio of sodium silicate to sodium aluminate, sodium silicate to sodium zincate, or sodium silicate to the combined mass of sodium aluminate and sodium zincate employed in forming the above sub-colloidal hydrosols can be varied from 10:1 to 1:10, by weight. As was established in numerous experiments, a preferred ratio is 1:1.

The preferred concentration of sodium silicate in the reaction medium, i.e., pigment furnish, ranges from 0.1% to 2%, by weight, the same pertaining to the concentrations of sodium aluminate, sodium zincate or combinations thereof. The use of reagent concentrations exceeding 2%, by weight, leads to an accelerated molecular-weight growth of sodium-silico-aluminate (zincate) macromolecules, reducing their chemical reactivity toward the inorganic cross-linking salts. To sustain a sufficient level of this reactivity for synthesizing complex functional microgels with adequate flocculating and cementing properties, the transient subcolloidal hydrosols evolving from such concentrated reagent solutions should be cross-linked within a period of a few seconds, which, in turn, necessitates the use of special, powerful in-line mixers/reactors.

The ratio of calcium chloride or equivalent inorganic cross-linking salt(s) to the combined mass of the transient, chemically reactive subcolloidal hydrosols to be cross-linked can vary from 1:10 to 10:1, by weight, but the simple ratio of 1:1 was found to be most satisfactory for synthesizing in situ complex functional microgels with adequate flocculating and cementing efficacies. While the inorganic cross-linking salts can be used in proportions ranging from 0.5% to 10%, by weight, relative to the composite pigment mass, the amount of calcium or equivalent bivalent and multivalent ions present in the reaction medium should optimally exceed by at least 50% the quantity of such ions bound chemically by the above-mentioned transient subcolloidal hydrosols. As was determined by a chemical analysis of filtrates from complex microgels synthesized in pure water, the latter excess of cross-linking ions reduces the residual concentration of unreacted silicate and aluminate (zincate) molecules to just a few parts per million.

It should be emphasized that the formation of both the (intermediate) transient, chemically reactive subcolloidal sodium-silico-aluminate or similar hydrosols and the (final) complex functional microgels used in practicing the present invention are not stoichiometric. Identical transient sub-colloidal hydrosols and identical complex microgels are synthesized each time, however, when the same compositions, concentrations, proportions, dosages, sequences and rates of addition of reagents, as well as the prescribed reaction conditions, are maintained precisely during the synthesis process.

As is typical of ultrafast chemical reactions in aqueous media, the in-situ formation of the complex functional microgels used in practicing the present invention is practically independent of the temperature of the reaction medium. The above microgels can be thus formed, in principle, within the entire temperature interval in which water remains fluid, provided that the stability of the reagents is not affected at elevated reaction temperatures. A special consideration, in particular, should be given to the limited thermal stability of the solutions of sodium aluminate.

The above virtual independence of the synthesis process from thermal conditions and regimes is a unique feature of the above complex microgels, which becomes readily apparent when comparisons are made with the methods of preparation of even much simpler single-component or two-component colloidal systems, such as gels or aquasols (colloidal suspensions of solid particles) known in the prior art. For example, countless patents disclosing various methods of manufacturing pharmaceutical preparations, ion exchangers, catalysts and other products based on extraneous, or in-situ prepared, gels, aquasols or precipitates, sometimes of identical chemical compositions, often differ merely with respect to some seemingly minor, though critical to these end products, successful synthesis, variations in the thermal regimes.

The broad latitudes relative to concentrations and chemical compositions of the reagents, as well as reaction conditions tolerable in synthesizing the complex functional microgels under discussion, are indicative of the enormous potency of the general colloid-chemical system used in practicing the present invention. It is worth noting that similar latitudes are intolerable with analogous processes of the prior art, according to which even the simplest, single-component and two-component colloidal systems based on silica and alumino-silicates, respectively, must always be synthesized under rigorously maintained procedural and thermal regimes and strictly defined pH conditions in the reaction medium, as well as concentrations, proportions and types of reagents.

A still more detailed discussion of the subject matter of the above complex functional microgels is provided in the specification to the co-pending patent application Ser. No. 07/919,831 ("Functional Complex Microgels with Rapid Formation Kinetics"), Filed Jul. 27, 1992.

The preferred pigmentary raw materials for synthesizing single-pigmentary-component, as well as composite, aggregate pigment products of the present invention, intended primarily for optical functions, encompass:

(a) very-fine-particle-size kaolin clays (often referred to in the trade as high-glossing clays), whose largest particles are about 95-100%, by weight, finer than 2 $\mu$m e.s.d., the average equivalent spherical diameter being about 0.25-0.35 $\mu$m;

(b) fine-particle-size calcined clays (derived from the above-mentioned very-fine-particle-size kaolin clays), whose largest particles are essentially 100%, by weight, finer than 3 $\mu$m e.s.d., preferably, 100%, by weight, finer than 2 $\mu$m e.s.d., the average equivalent spherical diameter being about 0.4-0.8 $\mu$m;

(c) extraneously precipitated pigments, such as calcium carbonate, calcium silicate, calcium sulfate, hydrated alumina, hydrated silica and alumino-silicates, whose largest particles are essentially 100%, by weight, finer than 5 $\mu$m e.s.d.;

(d) naturally occurring, beneficiated talcum, calcium carbonate and gypsum, whose largest particles are essentially 100%, by weight, finer than 5 $\mu$m e.s.d.; and (e) spherical, non-film-forming (non fusing into continuous films at room or moderately elevated temperatures) polystyrene and polyacrylic polymer-emulsion particulates ("plastic pigments"), having average particle diameters ranging from about 0.15 $\mu$m to about 0.5 $\mu$m.

The preferred subpigmentary raw materials, intended primarily for optical functions, encompass ultrafine particulate calcium silicates and alumino-silicates having average particle dimensions ranging from about 0.01 $\mu$m to about 0.1 $\mu$m, obtained by an intensive mechanical deagglomeration of the corresponding pigmentary materials.

The preferred pigmentary raw materials intended primarily for imparting various functional-performance features to the resultant aggregate pigments encompass montmorillonite, bentonite and synthetic high-oil-absorption materials, e.g., special grades of treated calcium silicates, having a specific surface area larger than 100 $m^2/g$ and whose largest particles are essentially 100%, by weight, finer than 5 $\mu$m.

The preferred subpigmentary raw materials intended primarily for imparting various functional-performance features to the resultant aggregate pigments encompass:

(a) ultrafine talcum, having average particle dimensions ranging from about 0.01 $\mu$m to about 0.1 $\mu$m, obtained by an intensive comminution of the corresponding commercial pigmentary materials;

(b) ultrafine precipitated calcium carbonate, having average particle dimensions ranging from about 0.01 $\mu$m to 0.1 $\mu$m, used in the state "as is" or additionally mechanically deagglomerated; and (c) spherical, non-film-forming (non fusing into continuous films at room or moderately elevated temperatures) polystyrene polymer-emulsion particulates having average particle diameters of about 0.03 $\mu$m.

The preferred auxiliary (nonpigmentary) particulate raw materials for synthesizing the aggregate pigment products of the present invention encompass:

(a) conventional polymer-emulsion adhesives (latexes), having average particle diameters ranging from about 0.07 $\mu$m to 0.3 $\mu$m;

(b) ultrafine polyacrylic emulsion-polymer adhesives, having average particle diameters smaller than 55 nm and glass-transition temperatures ranging from $+20°$ C. to $-60°$ C.;

(c) carbon black, preferably deagglomerated by the master-batch method described in the specification, used preferably in a combination with water-soluble and/or disperse (polymer-emulsion) adhesives and organic polyelectrolytes;

(d) organic color dyes, used preferably in a combination with water-soluble and/or disperse (polymer-emulsion) adhesives and organic polyelectrolytes; and (e) synthetic and/or cellulosic microfibrils with a length of about 1-10 $\mu$m.

The preferred auxiliary water-soluble materials for synthesizing the aggregate pigment products of the present invention encompass:

(a) natural and/or synthetic water-soluble adhesives, such as starch, protein, polyvinyl alcohol or polyacrylates;

(b) organic, cationically active chemical compounds with at least two reactive groups in each molecule, such as cationic surfactants, organometallic Werner complexes and cationic polyelectrolytes; and (c) ionically-active, preferably cationic, water-soluble organic color dyes.

The principal concept at the foundation of the present invention, relying on a controlled coaggregation of particulate low-refractive-index pigmentary and/or subpigmentary materials, optionally also with particulate and/or soluble non-pigmentary auxiliary ones, is based on the following premises:

(1) Applicant's discovery of the favorable effect of an in-situ aggregation of very fine pigment fractions (pigment fines) on the light-scattering properties of the resultant aggregate formations, published in the previously mentioned article in *TAPPI Journal*, Vol. 53, No. 11, 1970.

(2) Experimental results of applicant's extensive research and development work pertaining to the scientific foundations of designing and synthesizing aggregate pigment products having both an increased optical-performance efficacy and novel functional properties.

(3) Vast amounts of technical information gathered from extensive laboratory and pilot-plant evaluations of a variety of plain aggregate pigments, made of a single pigmentary raw material, as well as composite aggregate pigments, synthesized with the aid of the applicant's technology disclosed in U.S Pat. No. 5,116,418 and the co-pending patent applications Ser. Nos. 07/811,603 (Filed Dec. 23, 1991), now abandoned and 07/919,831 (Filed Jul. 27, 1992) now abandoned.

(4) The inherent potential of the in-situ synthesized complex functional microgels to instantaneously, indiscriminately and completely flocculate (coflocculate), and subsequently cement, any and all particulate materials dispersed in an aqueous medium.

(5) Reasoning processes employing methods used in the philosophy of science.

A laboratory synthesis of an optically very efficient aggregate pigment, made of a single low-refractive-index, optically inferior pigmentary raw material, is illustrated in the example to follow.

EXAMPLE I

The above-mentioned aggregate pigment was synthesized with the aid of a specially developed laboratory procedure intended to simulate the continuous synthesis process routinely employed in full-scale plant manufacturing operations. A very-fine-particle-size kaolin clay (defined previously) was used as the pigmentary raw material. For the sake of simplicity, the proportions listed below were purposely scaled down to a starting mass of 100 g of pigmentary raw material(s).

A 100 g batch (dry weight) of the above clay, used in the form of a well-dispersed 70%-solids slurry, was introduced into a stainless steel beaker with a capacity of 800 cm$^3$. A powerful drill press equipped with a high-lift stirrer was employed for an intensive agitation of the pigment furnish to maintain dynamically a statistically uniform spatial distribution of all particulate furnish components. After a thorough homogenization, a predetermined amount of dilution water (see below) was introduced into the furnish, followed by an addition of 2 g (dry weight) of a polyacrylic-vinylacetate latex of the type commonly used in the paper industry.

Separate solutions of sodium silicate and sodium aluminate, prepared at 5% solids, were injected in the proportions of 2 g each (dry weight) into the agitated furnish with the aid of syringes placed at diametrically opposite sides of the beaker. After about 20 to 120 seconds from the moment of the injection of the above reagent solutions, a 5% solids solution of calcium chloride in the proportion of 4 g (dry weight) was injected into the agitated furnish. The amount of the dilution water employed was calculated so as to attain a final solids concentration of about 20% in the flocculated furnish.

The instantly flocculated slurry was aged for a period of 2 to 12 hours before filtration and rinsing. The resultant filtercake was divided into two portions, one of which was dried, precrushed to pass through a 150-mesh screen (corresponding to a mesh diameter of about 100 $\mu$m), pulverized to the desired particle-size distribution and made down into a well-dispersed 50%-solids slurry using a blend of 1%, by weight, of tetrasodium pyrophosphate and 0.5%, by weight, of Dispex N-40 (a polyacrylate compound) as the dispersants. The above procedure is referred to hereinafter as the "dry" processing mode.

By using a procedure referred to hereinafter as the "wet" processing mode, the other portion of filtercake was converted directly into a slurry, in the state "as is," relying on the hydraulic, rather than thermal, curing of the microgel cement. The resultant aggregate pigment was made directly into a 50%-solids slurry, using the same dosages of the above-mentioned dispersants. The desired particle-size distribution was obtained by a controlled energy input via a high-shear agitation of the slurry.

Composite pigment samples prepared by the dry and wet processing modes differ normally with regard to the particle-size distribution, the thermally cured samples prepared by the dry-processing mode being coarser than those obtained by the wet-processing one. To obtain an equal particle-size distribution, the thermally cured sample must undergo a very intensive pulverization regime. As was established in extensive evaluations, the best optical-performance efficacy is obtained when the particle-size distribution of the resultant aggregate pigment is only slightly coarser (at the coarse end) than that of the coarsest pigmentary raw material employed in the synthesis. For example, when the very-fine-particle-size kaolin clay employed as the raw material in Example I is 98–100%, by weight, finer than 2 $\mu$m e.s.d., the resultant aggregate pigment product should be about 95–96%, by weight, finer than 2 $\mu$m e.s.d. In the case of properly synthesized and comminuted aggregate pigment products, the particle-size coarsening due to the aggregation should be most pronounced with the pigment fractions encompassing particles finer than 0.7 $\mu$m e.s.d.

The precrushing of the dried filtercake, as employed in the dry-processing mode described in Example I, is not needed in plant operations relying on flash drying and classifier-equipped pulverizers. However, when a hydraulically cured filter cake is dispersed and then spray dried, such as may be necessitated by reasons of economy when the end product is to be shipped across long distances, the resultant "beads" become very hard. As a consequence, precrushing, followed by a very-intensive (multipass) comminution with the aid of conventional pulverizers, becomes virtually mandatory.

Although the wet route is commercially more attractive, the dry route is often indispensable in synthesizing aggregate pigment products containing auxiliary materials, such as carbon black, organic dyes, microfibrils, non-film-forming emulsion polymers, and the like. Even in those instances in which the wet route is feasible, it should be borne in mind that hydraulic curing of virtually all inorganic cements is affected by the ambient medium. Hence, with some pigmentary or auxiliary raw materials present in the furnish used for the synthesis of the aggregate pigment products of the present invention, the microgel cements may become adequately cured in about 2 hours while other pigmentary and auxiliary raw materials may prolong the cement-curing period to about 24 hours or even longer.

The optical-performance efficacy of the aggregate pigment product from Example I was assessed in terms of the light-scattering coefficients ($s_{457}$) of binderless coating films deposited on optically flat black glass plates as the coating substrates, using the experimental techniques described by Kaliski in *TAPPI Journal* 53, No. 11, 1970, Pages 2077–2084. The light-scattering coefficients were 0.170 m$^2$/g for the aggregate pigment product under discussion compared with 0.050 m$^2$/g for the very-fine-particle-size clay raw material employed. The magnitude of practical significance of the above-mentioned increase of the light-scattering coefficient to a value of 0.170 m$^2$/g shall become more readily understood hereinafter.

As is well known to those skilled in the art, kaolin clays are by far the most important pigments used in the paper industry. About 20 years ago, all coating and filler clays, as well as the mechanically delaminated clays, were manufactured almost exclusively from the optically efficient "white-clay" crudes. The light-scattering-coefficients ($s_{457}$) for the best pigment products made from the latter crudes ranged from 0.12 m$^2$/g for the No.1 coating clays to 0.17 m$^2$/g for the mechanically delaminated clays. In contrast, the optically inferior "gray-clay" crudes were employed in the past almost exclusively for the manufacture of "high-glossing" coating clays with light-scattering-coefficients barely exceeding 0.05 m$^2$/g.

During the past two decades, however, the quality of clay pigments has deteriorated across the board since, first of all, the deposits of high-quality, coarse-particle-size white-clay crudes have become very scarce, if not exhausted. Secondly, the use of modern, ever-faster coating machines has created a demand for pigment slurries with improved high-shear rheology, such as was impossible to attain, for all practical purposes, with clay pigments made of the previously mentioned coarse, white-clay crudes. As a consequence, virtually all commercial clay pigments are presently manufactured from blends of lower-quality white-clay crudes (substantially finer than the corresponding "old" high-quality crudes) with very-fine-particle-size gray-clay crudes, the light-scattering coefficients of the best contemporary clay-pigment products being rarely higher than about 0.1–0.11 m$^2$/g.

Although the aggregate pigments of the present invention almost completely satisfy the needs of the new technological trends taking foothold in the paper industry, as shall be explained in some detail hereinafter, the entire concept underlying the pigments in question would be worthless without an adequate raw material basis for future expansion. Fortunately, there are almost inexhaustible reserves of gray-clay and equivalent crudes in the United States, in Georgia as well as other states. Moreover, the aggregate pigments in question can be made from virtually any kind of gray-clay crudes, even those which are totally useless in the context of pigment-manufacturing technologies of the prior art because of an unacceptable rheology or poor beneficiating characteristics.

The aggregate pigments synthesized in accordance with the general method described in Example I are true bulking pigments (thixotropic), gelling in the state of rest and flowing readily when shearing forces are applied. Aqueous slurries of these pigments do not settle at all, unless diluted below a concentration needed to sustain a gel; but even then, the sediments formed are very soft and bulky and can be redispersed easily by simple agitation.

The above-described behavior is of utmost importance in high-speed paper-coating applications. For example, the newest paper-coating machines are capable of operating speeds exceeding 6000 ft/min, blade coaters operating at speeds approaching 8000 ft/min already being technically feasible. The principal obstacle to a practical implementation of the latter coating speeds, however, is the lack of suitable coating pigments. As is well known to those skilled in the art, it is impossible to apply the contemporary high-solids coating formulations containing either conventional pigments or the aggregate (flow-hindering) pigments of the prior art on coaters operating at speeds in the 6,000 to 8,000 ft/min range without insurmountable rheological difficulties.

The latter difficulties could be circumvented, at least in principle, by lowering the formulation solids; however, the quality of the resultant coating films would be rendered totally unacceptable by contemporary standards. On the other hand, diluted thixotropic coating formulations based on the aggregate pigments of the present invention, while gelled at rest, become fluid when passing through the high-shearing zone under the applicator blade. As a consequence, the freshly applied coating films, though relatively dilute, become rapidly immobilized after emerging from under the blade and yield bulky, smooth and uniformly-structured coating films, the detrimental binder migration and formation of coating mottle being vastly reduced or even eliminated.

Coating trials carried out on both pilot-plant and full-scale production coaters at machine speeds ranging from 5,000 to 6,000 ft/min indicate that yet much higher coating speeds are practically feasible using coating formulations based on aggregate pigments of the type synthesized in Example I. It should be pointed out, however, that the shear-thinning formulations based on aggregate pigments of the present invention have a tendency to fill the depressions in the base sheet surface. Hence, it is highly advantageous to optimally prefinish the base sheet prior to coating which, in effect, strongly reduces both the coating demand as well as the need for a severe post-finishing (calendering) of the already coated paper.

The beneficial effect of base-sheet prefinishing on the optical and printing properties of lightweight-coated publication paper was reported by Kaliski in *TAPPI Journal*, Vol. 55, No. 1, 1972, Pages 102–110, preceded by a presentation at the Coating Conference of the Technical Association of the Pulp and Paper Industry held in Lake Kiamesha, N.Y., May 16–20, 1971.

Since the surface of contemporary lightweight publication paper base sheets consists of microscopic "hills" and "valleys" (depressions), the flow-hindering mechanically delaminated clay pigments, containing numerous large-diameter platelets, were developed specifically to bridge over the hills, thus preventing the freshly applied coating films from filling the surface depressions and providing thicker, "bulkier" coating layers. Similar effects can be obtained also with the aid of the thermally aggregated (sintered) calcined clays and "bulking" pigments of the prior art, both of which work on the principle of flow hindering by inducing dynamically (rheologically) an accelerated immobilization of freshly applied wet coating films.

As is well known to those skilled in the art, it is much easier to generate surface smoothness, such as is called for by end-product specifications, by calendering soft, uncoated webs rather than the already-coated, rigid ones. As was clearly established in laboratory and pilot-plant trials, coatings applied onto smooth (prefinished) base sheets require considerably less postfinishing (supercalendering) to yield a comparable degree of surface smoothness than analogous coatings applied onto non-prefinished base sheets.

It was also established with coated sheets made with the aid of both prefinished and non-prefinished base sheets, supercalendered to the same surface smoothness, that identical coatings have a higher gloss, opacity and brightness, as well as better printability, on prefinished than on non-prefinished base sheets. Moreover, it was found that the aggregate pigments of the present invention, being authentic bulking (thixotropic) pigments, provide highly-bulked, uniquely smooth and uniformly structured coatings on prefinished base sheets, unmatched with any pigment products of the prior art. In contrast, the mechanically delaminated clays, calcined clays and the "bulking" pigments of the prior art, which are normally superior to the conventional No. 1 or No. 2 coating clays in coatings on rough surfaces, are merely equivalent to the latter in coatings on smooth, prefinished substrates.

The above findings are of utmost importance with regard to the emerging technological trends aimed toward ultrahigh-speed coating applications. First of all, a coating formulation amenable to the latter applications must be shear-thinning (thixotropic), whereas both the conventional coating pigments as well as the "bulking" pigments of the prior art are inherently dilatant. As a consequence, the latter pigments would have to be used in excessively diluted coating formulations, resulting in an unacceptable coating quality. Secondly, because of obvious drier-capacity limitations inherent to virtually all ultrahigh-speed coating machines, the coating weights must be considerably lower than those tolerable in the current industrial practice, without detriment to the resultant coating quality.

As is readily understood by those skilled in the art, the only theoretically possible solution to the above-described, presently unsurmountable technical difficulties is to apply relatively low-solids yet pronouncedly thixotropic coating formulations onto well-prefinished base sheets to "instantly" immobilize the freshly applied coating films emerging from under the applicator blade. Such an instant immobilization is absolutely necessary for "freezing" the initial, statistically uniform spatial distribution of the particulate components in freshly applied (wet) coating films, as well as for eliminating detrimental binder migration (especially rampant with diluted formulations) and obtaining a maximum coating-film thickness in relation to the coating mass. Moreover, the above instant immobilization virtually completely eliminates the fast and non-uniform hydraulic drainage of the coating-water into the base sheet, any transport of water becoming possible only by the slow mechanism of volume diffusion. While the removal (evaporation) of coating water that already has penetrated into the base sheet interior can be accomplished only after the entire sheet mass becomes appropriately (and wastefully) hot, the water contained in the gelled (immobilized) coating films evaporates rapidly due to the stream of hot air from the driers impinging directly upon the latter films.

As is obvious from the above considerations, the aggregate pigments of the present invention, unlike all coating pigments known in the prior art, are uniquely suited for the impending ultrahigh-speed coating applications. Most importantly, the aggregate pigments in question already make it possible to realize the most attractive, though hitherto technically infeasible, goal of "on-machine" manufacture of high-quality coated paper, with base sheet formation, prefinishing, coating and finishing being carried out in a single, continuous pass on the same paper machine.

The following example demonstrates how the aggregate pigment from Example I, added in even moderate proportions to coating formulations containing conventional delaminated coating clays, substantially improves both the optical and printing performance of the resultant paper coatings.

EXAMPLE II

A 55%-solids coating formulation of the type used routinely in the manufacture of lightweight gravure papers was prepared using a pigment blend containing 75%, by weight, of a commercial mechanically delaminated clay and 25%, by weight, of the aggregate pigment from Example I. A styrene-butadiene latex (Dow 620) was used as the coating adhesive in proportion of 5 parts (dry weight) per 100 parts of the above-mentioned pigment blend. An analogous control coating formulation was prepared using delaminated clay as the sole pigment.

Each of the above formulations was applied onto a typical commercial lightweight publication paper base sheet with a basis weight of 28 lbs./3300 ft$^2$ at a rate of 5 lbs./3300 ft$^2$ C1S (coated one side). Both coated paper samples were supercalendered under such conditions at which the sample coated with the control formulation acquired a coating gloss of approximately 50%.

As established by visual inspection, the paper sample coated with the formulation containing 25 parts of the aggregate pigment had better surface coverage and coating lay as well as higher K&N ink-receptivity and better K&N ink-stain uniformity than the paper sample coated with the control formulation. It was further established with the aid of instrumental determinations that the gloss, brightness and opacity of the paper sample coated with the formulation containing 25 parts of the aggregate pigment were higher by 5; 2.5; and 1.5 percentage points, respectively, than the analogous optical properties of the sample coated with the control formulation.

The optical and fiber-debonding performance of the aggregate pigments of the present invention in paper-filling applications was evaluated in the following example. The aggregate pigment under evaluation was prepared from the same raw materials and by the same synthesis method as the aggregate pigment from Example I, but contained additionally 2 parts, dry weight, of an ultrafine polymer-emulsion adhesive (polybutylacrylate with a glass-transition temperature of $-50°$ C. and an average particle diameter finer than 55 nm) per 100 parts of the aggregate-pigment mass.

EXAMPLE III

Two sets of handsheets with a basis weight of 60 g/m², containing various levels of fillers, were prepared with the aid of a laboratory sheet mold using a 50:50 softwood/hardwood fiber combination. The furnish was flocculated using 20 lbs. alum and 1 lb. high-molecular-weight polyacrylamide retention aid per ton of the combined fiber/filler mass. The acidity of the furnish was maintained at a pH level of 4.5 with the aid of sulfuric acid.

The first set of handsheets, further referred to as the "principal" system, was filled with the aggregate pigment mentioned above. The second set, further referred to as the "control" system, was filled with a commercial mechanically delaminated clay.

The brightness of the unfilled reference handsheets was about 86% and did not change appreciably with the increasing filler-loading levels with either the principal or the control systems. The opacity of the unfilled reference handsheets was 71%, increasing to 84.4% with the control system and to 85.1% with the principal system when the filler-loading level in the handsheets reached 10%, by weight. The 10% filler-loading level was selected purposely for the control sample filled with the delaminated clay in that, as is well known to those skilled in the art, the reduced mechanical sheet strength associated with the latter filler-loading level is considered as being still adequate for normal end-use applications of paper grades of the above-discussed type.

Since the optical properties of different filled paper samples must always be compared at an equal mechanical sheet strength, the mechanically much stronger principal handsheets filled with the aggregate pigment had to be brought up to a filler-loading level of 16.5%, by weight, to reduce the latter's strength to the strength level of the control handsheets containing 10%, by weight, of the mechanically delaminated clay. At the above-mentioned filler-loading level of 16.5%, the opacity of the principal handsheets was equal to 88.2%, which constitutes an increment of 3.8 percentage points above the opacity of handsheets filled with the mechanically delaminated clay, having equal mechanical strength.

The latter increment is a major one and could be attained otherwise only by substituting a substantial proportion of the mechanically delaminated clay with the far more expensive $TiO_2$. The additional important benefit gained from using the aggregate pigment in question under the above-mentioned filler-loading conditions was a replacement of 130 lbs. of the expensive chemical pulp per each ton of filled paper product with a vastly less expensive and ecologically far more preferable mineral filler.

As is well known to those skilled in the art, the optical efficacy of filler pigments known in the prior art decays rapidly with the increasing filler-loading level. Hence, when the sheet opacity is plotted as a function of filler-loading level, the slope of the resultant curve is initially steep but decreases at a constantly accelerating rate. As a matter of fact, the opacity curve becomes frequently virtually flat (parallel to the x-axis) when a certain filler-loading level is exceeded, as if the additional filler increments became "optically inert." The three principal reasons underlying the above decay of the opacifying power are associated with (a) an excessive filler-particle flocculation, such as is practically unavoidable if a high first-pass filler retention is to be obtained; (b) a progressive detrimental overflocculation occurring during the recirculation of the unretained portion of the filler on the paper machine; and (c) the unavoidable physical crowding of filler particles at high filler-loading levels in the sheet.

The above-mentioned problems are largely absent with the aggregate pigments of the present invention, as is evident from the data in Example III according to which the decay of the optical-performance efficacy of the aggregate pigment with the increasing filler-loading level is barely noticeable. The principal reason for the above favorable performance characteristic is that the preaggregated pigments are much more resistant to a detrimental flocculation than unadulterated (discretely particulate) pigments of the prior art, both during the first-pass retention as well as the subsequent recirculation on the paper machine. Hence, the level of first-pass retention can be safely upgraded, e.g., by increasing the filler concentration in the papermaking furnish (a practice normally avoided in the paper industry), in that the optical efficacy of the preaggregated pigments, unlike that of the conventional fillers, is little affected during the recirculation. Furthermore, the preaggregated pigments are fundamentally resistant to, if not outright incapable of, forming the optically inefficient, densely packed structures generated unavoidably with the conventional, pronouncedly heterodisperse pigments of the prior art.

Indeed, as was established with the aid of instrumental measurements carried out with the filled handsheets prepared in Example III, the principal paper sample containing 10%, by weight, of the aggregate pigment had a 0.5 percentage-point higher opacity than the analogous control sample containing 10%, by weight, of the mechanically delaminated clay. To quantitatively assess the opacity-decay characteristic of both pigment samples under discussion, the filler-loading level was increased to 22%, by weight. At the latter loading level, the opacity of handsheets containing the aggregate pigment was 2.0 percentage points higher than that of analogous handsheets containing the mechanically delaminated clay, which constitutes a relative advantage of 400% over that enjoyed by the aggregate pigment at the loading level of 10%.

Another beneficial functional property of the aggregate pigment used in Example III is reduced fiber debonding. As is well known in the art, the main culprits in fiber debonding by filler pigments are pigment fines, i.e., particles finer than about 0.15-0.2 μm e.s.d., present more or less abundantly in the conventional mineral filler products. Obviously, then, a significant reduction of fiber-debonding by the aggregate pigment under discussion is obtained by effectively "tying up" these fines by aggregation. By far the major factor in reducing the fiber debonding tendency of the latter pigment is, however, the microadhesive action of the previously mentioned ultrafine polymer-emulsion adhesives built into the aggregate pigment structure.

Building the above-mentioned ultrafine polymer-emulsion adhesives into aggregate pigments, to reduce the latter's fiber-debonding tendency, was disclosed by the applicant in the patent application Ser. No. 07/958,283 (Ultrafine Polymer-Emulsion Adhesives for Microadhesion), Filed Oct. 9, 1992, incorporated herein by reference. The above adhesives are vastly different from the conventional polymer-emulsion adhesives (latexes) of the prior art, manufactured commonly in the form of 50%-solids emulsions with average particle diameters ranging from 70 nm to 300 nm, most frequently from 160 nm to 200 nm. In contrast, the novel ultrafine polymer-emulsion adhesives can be synthesized only at much lower solids, usually 30-40%, by weight, and have average particle diameters smaller than 55 nm, preferably smaller than 40 nm.

The aggregate filler pigment used in Example III, containing the novel ultrafine polymer-emulsion adhesives built into the aggregate structure, is the first ever having demonstrably reduced fiber-debonding properties compared to those of all other mineral filler pigments known in the prior art. To obtain such reduced fiber-debonding properties, at least 2 parts (dry weight) of the above-mentioned ultrafine polymer-emulsion adhesives must be employed for each 100 parts of the very-fine-particle-size clay raw material. It should be pointed out, however, that a similar reduced fiber debonding can not be obtained by building any practically feasible amount of conventional latexes into the aggregate filler pigments under discussion.

As is readily understood by those skilled in the art, mineral pigments, in general, and the aggregate pigments under discussion, in particular, have an intrinsic "sink capacity" for containment of certain amounts of adhesives, below which the latter are fully "consumed" internally. The sink capacity in question must first be satisfied, of course, for some adhesive "surplus" to become available for extraneous purposes, such as the formation of microscopic adhesive joints between the aggregate-pigment particles on the one hand and cellulosic fibers in filled paper webs on the other.

That attaining an adhesive surplus under practically acceptable conditions is possible only with the aid of the novel ultrafine polymer-emulsion adhesives is best understood considering that the average particles of the very-fine-particle-size clay raw material used for synthesizing the type of aggregate pigments under discussion may be even as fine as 0.2-0.25 μm e.s.d. Hence, for each such average clay particle one can obtain from 5 to 7 microadhesive sites (potential microadhesive joints) using as little as 1.5-2 g (dry weight) of the ultrafine polymer-emulsion adhesives, with average particle diameters of 40 nm, per 100 g of the above-mentioned clay raw material. By comparison, at least 100 g (dry weight) of typical latexes commonly used in the paper industry, with average particle diameters of about 160 nm, would be needed to provide the same number of potential adhesive sites under comparable conditions. As is readily understood, employing such a high proportion of latex adhesives to attain the same effects would be entirely impractical, notwithstanding the fact that particles of the above-mentioned latexes are far too large to form proper microadhesive joints between pigment fines.

As is also readily understood, the adhesive sink capacities of minerals having high specific surface areas, such as bentonite, montmorillonite and some synthetic mineral products, are considerably higher than those of even the finest pigmentary minerals used in the paper industry. Accordingly, the dosages of the ultrafine polymer-emulsion adhesives needed to impart reduced fiber-debonding properties to aggregate filler pigments containing these adhesives can reach up to 5% of the aggregate pigment mass.

The goal of developing technologies for a routine manufacturing of papers with filler-loading levels in excess of 25% or even 30%, by weight, referred to in the trade as "high-ash" papers, has been pursued intensively in the paper industry for many years. The main obstacles to realizing the above goal are the progressive deterioration of the mechanical sheet strength and the decay of fillers' opacifying efficacy, both of which become ever more pronounced with the increasing filler-loading level, as well as the fact that most of the mineral filler pigments of the prior art are too abrasive for use in the above-mentioned high-ash applications.

Realistically, therefore, there is little chance that the above obstacles can be overcome in the foreseeable future with the aid of the technologies and pigmentary materials known in the prior art. As a matter of fact, the far more complex and difficult aspects of the functional properties of pigmented fiber systems have hitherto never been seriously addressed, to the best of the applicant's knowledge. In accordance with the present invention, however, it is relatively easy to custom-design, almost at will, countless types of aggregate pigments having both an outstanding optical-performance efficacy as well as novel, desirable functional properties. The latter pigments are uniquely applicable not only to high-ash filling, but also to the manufacture of many novel valuable paper products that were hitherto either infeasible or impractical with the aid of the materials and technologies known in the prior art.

Particularly worth underscoring is the uniquely low abrasivity of the aggregate pigments used in Examples I-III. Multiple assays carried out with the aid of the Einlehner's tester have shown that the abrasiveness of the latter pigments ranges from 0 (zero) to 0.5 mg, qualifying them as perhaps the least abrasive mineral fillers ever used in the paper industry. The importance of low abrasiveness can be best illustrated by the fact that the fine-particle-size calcined clay, which, from the standpoint of opacifying efficacy and overall economy, is perhaps the most attractive single filler pigment known in the prior art, is rarely used at loading levels exceeding 4% of the total mass of paper, mainly due to a prohibitive abrasiveness exceeding by at least 30 times that of the aggregate pigments under discussion.

The following example demonstrates how the aggregate filler pigment from Example III is applicable to the manufacture of "high-ash," color-coded papers with extra-high opacity, designed specially for a show-through-free, two-sided computer printout.

EXAMPLE IV

High-ash handsheets with a basis weight of 57.1 lbs. per 3000 ft$^2$, loaded with the above-mentioned filler to a relative content of 35.0%, by weight, were prepared from a 50:50 softwood/hardwood blend using a laboratory handsheet mold and the novel alkaline papermaking process disclosed by the applicant in the U.S. Pat. No. 5,240,561 (Acid-to-Alkaline Papermaking Process), incorporated herein by reference. A blue dye (Victoria Blue) and the previously mentioned ultrafine polymer-emulsion adhesive were added, in the state "as is" (loose), directly to the papermaking furnish in proportions of 2 lbs./t and 30 lbs./t, respectively.

The resultant unfinished handsheets had an opacity of 98.0% and a brightness of 82.3%. The Hunter color parameters L* (lightness—white to black), A* (red-to-green spectrum), and B* (yellow-to-blue spectrum), determined in accordance with the TAPPI Method T 524 su-72, were 85.0, −4.2 (green) and −7.8 (blue), respectively. After supercalendering (1 nip per side at 180 pli. and 150° F.), the opacity and brightness of the handsheets were 96.6% and 79.9%, respectively.

The supercalendered handsheets from the above example had a very light, extremely uniform blue pastel color and a very attractive appearance, such as is normally typical only of high-quality coated sheets. Because of the unusually high opacity, the above sheets were found to be uniquely suited for a two-sided computer printout without any detrimental print showthrough from the opposite side of the sheet being noticeable. It is worth noting in the above context that duplicating the opacity level of 96.6%, obtained with the high-ash samples from Example IV, requires a stack of three typical commercial computer-printout or office-reproduction sheets, supercalendered to a comparable smoothness.

Due to the unique surface smoothness, such as can be generated only by supercalendering of uncoated high-ash papers, the handsheets in question were able to accommodate simultaneously not only a high-resolution laser-printed text and illustrations, but also the finest technical drawings for which the cumbersome and slow ink-plotters and expensive coated mylar sheets are presently being used. It was also possible to reproduce even the subtlest gradations in halftone patterns with great fidelity and outstanding contrast due to the high lightness and very-light pastel color of the supercalendered high-ash handsheets under discussion.

Colored aggregate pigments of the present invention can be obtained most economically by directly building organic and/or inorganic color dyes into the aggregate structure. Blue and red dyes built into the latter pigments, in proportions as low as 0.005% of the aggregate-pigment mass, successfully eliminate the yellow hue inherent to virtually all commercial natural and synthetic mineral pigments. Aggregate pigments containing up to 5.0%, by weight, of color dyes can be used advantageously in the manufacture of colored papers with the aid of the conventional acidic and alkaline papermaking processes in that the latter, though inefficient in retaining loose organic color dyes, are quite efficient in retaining mineral fillers.

It is necessary, however, to carefully monitor the adhesive strength of the microgel cements employed in synthesizing colored aggregate pigments in that the latter strength is usually adversely affected by the incorporation of organic dyes. The incurred reduction of the adhesive strength of the microgel cements has to be compensated, especially when high proportions of dyes are being employed, by simultaneously building up to 5%, by weight, of disperse and/or water-soluble polymer adhesives into the aggregate-pigment structure.

It should be pointed out also that some organic dyes are difficult to totally and irreversibly immobilize within the aggregate-pigment structure. A complete such immobilization, preventing the release of even traces (e.g., on the order of parts per billion) of colored matter in aqueous slurries of the aggregate pigments under discussion, can be obtained, however, with the aid of high-molecular-weight organic, water-soluble polymers, preferably, but not exclusively, cationic polyelectrolytes, used in proportions of from 0.001% to 0.1% of the aggregate-pigment mass. Cationic and nonionic water-soluble polymers can be added directly to the solution of the inorganic bivalent and/or multivalent cross-linking salts used in synthesizing the aggregate pigments in question. Anionic water-soluble polymers, on the other hand, can be added to the already flocculated furnishes.

Even higher filler-loading levels than those obtained in Example IV, e.g., in excess of 50%, by weight, in addition to extremely high first-pass filler-retention efficiencies, can be obtained by employing simultaneously (a) the aggregate pigments from Example III, having additionally synthetic and/or cellulosic microfibrils built into the aggregate-pigment structure in proportions of from 0.1% to 2%, by weight; (b) the applicant's previously mentioned alkaline papermaking process; and (c) the previously mentioned ultrafine polymer-emulsion adhesives, added directly to the papermaking furnish used in (b) above.

The cellulosic microfibrils are prepared by a process referred to in the claims to follow as the "cascade (multistage) defibrillation," disclosed in U.S. Pat. No. 5,240,561. According to the above process, cellulosic fibers, derived preferably from cotton or well-fibrillating cellulosic pulps, are submitted to the following consecutive processing steps:

(a) dry or wet chopping of fibers to a length preventing a hydraulic spinning in the subsequent wet refining operations, the chopped-fiber length in question being dependent on both the furnish solids and type of refining equipment;

(b) refining of chopped fibers resulting from step (a) at the highest practically feasible solids concentrations, e.g., of up to 30–35%, by weight, preferably in the presence of sodium silicate, Congo red, and/or other inorganic and organic defibrillation-enhancing agents;

(c) additional refining of the system resulting from step (b) with the aid of centrifugal comminuters, exemplified by the well-known colloidal mills; and (d) finalizing of the defibrillation attained in step (c) with the aid of Gmolin homogenizers or equivalent equipment in which the fibrous furnish is compressed at very high pressures and then rapidly decompressed by passing through a nozzle, causing the residual bundles of fibrils to "explosively" separate into individual microfibrils.

The optimum length of microfibrils applicable to the synthesis of high-retention, low-debonding aggregate pigments of the present invention ranges from about 1 $\mu$m to 10 $\mu$m. Since neither the cellulosic nor synthetic microfibrils adhere by themselves to inorganic pigments, conventional latexes, the previously mentioned ultrafine polymer-emulsion adhesives, or water-soluble polymer adhesives, such as starch, polyvinyl alcohol or polyacrylates, should be employed simultaneously in proportions of from 2% to 3% of the aggregate-pigment mass.

Countless composite aggregate pigment products can be prepared also in accordance with the present invention using two or more pigmentary and/or subpigmentary raw materials. The two subsequent examples deal with a high-optical-performance composite aggregate pigment product synthesized from a blend of a fine-particle-size calcined clay and a very-fine-particle-size kaolin clay as the pigmentary raw materials.

EXAMPLE V

A composite aggregate pigment consisting of 25 parts of fine-particle-size calcined clay, 75 parts of very-fine-particle-size kaolin clay and 2 parts of ultrafine polymer-emulsion adhesive, intrinsically cemented with a calcium-silico-aluminate microgel, was prepared in accordance with the procedure used in Example I.

The resultant composite aggregate pigment had a brightness of 90%, an average particle size of 0.42 $\mu$m e.s.d. and was completely devoid of particles finer than 0.34 μm e.s.d.. A 50%-solids aqueous slurry of the above pigment was prepared in the manner as described in Example I.

The optical-performance efficacy of the composite aggregate pigment from Example V in paper-filling applications was evaluated in the following example:

EXAMPLE VI

A set of laboratory "high-ash" handsheets with a basis weight of 64 lbs./3300 ft$^2$, containing 39.4%, by weight, of the above-mentioned composite aggregate pigment, was prepared in the same manner as the handsheets in Example IV. The corresponding unfilled, similarly prepared, control handsheets had a basis weight of 60.2 lbs./3300 ft$^2$, a brightness of 83.16% and an opacity of 81.60%.

A blue dye (Spectrachem Blue) was added directly to the papermaking furnish in a proportion sufficient to revert the Hunter color parameter B* (yellow-to-blue spectrum) from +3.0 (yellow tint), inherent to the control handsheets, to −3.64 (bluish tint) in the resultant filled handsheets.

The high-ash filled handsheets from Example VI had a sheet brightness of 85.4% and an opacity of 97.6%. Since comparable levels of sheet opacity can be obtained otherwise only with the aid of massive proportions of the far more expensive TiO$_2$ fillers, a set of analogous TiO$_2$-containing reference handsheets, needed for making realistic comparisons, was simultaneously prepared. The handsheets in question had a basis weight ranging from 59.7 to 62.7 lbs. per 3300 ft$^2$, a TiO$_2$ content ranging from 40.1% to 42.0%, by weight, and a sheet opacity ranging from 96.5% to 97.2%.

The brightness of TiO$_2$-filled reference handsheets, ranging from 92.3% to 93.8%, was, of course, considerably higher than that of the handsheets filled with the composite aggregate pigment under discussion. However, the TiO$_2$-filled handsheets also had an undesirable yellowish tint (a B* parameter of +1.1 to +1.3), such a tint being absent in the filled handsheets from Example VI.

It is also worth pointing out in the above context that increasing the opacity of paper is far more costly and difficult than increasing paper brightness. For example, a higher paper brightness can be obtained readily and economically by using a brighter cellulosic pulp or high-brightness fillers, such as precipitated hydrated alumina, metal-silicates or calcium carbonate, which are much less expensive than TiO$_2$. On the other hand, the use of the expensive TiO$_2$ has been virtually mandatory in the prior art if writing (printing) papers with opacities in excess of 93-95% were to be obtained.

Although the composite aggregate pigments of the type synthesized in Example V can include, in principle, from about 0.5% to 99.5%, by weight, of the fine-particle-size calcined clay, the abrasivity of composite pigments containing very high levels of the latter raw material may be too high for many practical applications. According to the present experience, the composite aggregate pigments consisting of 25 parts calcined clay and 75 parts very-fine-particle-size kaolin clay offer a uniquely favorable combination of high optical-performance efficacy, acceptably low pigment abrasivity and an outstanding economy.

Composite aggregate pigments similar to those synthesized in accordance with Example V, but optically more efficient and also far less abrasive, can be obtained using high-brightness precipitated calcium-silicate or alumino-silicate pigmentary raw materials instead of calcined clay. The latter metal silicates are synthesized, as a rule, in the form of ultrafine ("elementary") particles with dimensions ranging from 0.01 μm to 0.03 μm, which agglomerate rapidly into coarse ensembles with equivalent spherical diameters frequently exceeding 10 μm. All commercially available metal-silicate pigments are sold in such a highly agglomerated form. The applicant found it advantageous, however, to first mechanically break up the coarse agglomerates into the original ultrafine elementary particles with the aid of high-shear kneading or intensive comminution before using them as subpigmentary raw materials for the synthesis of the aggregate pigments of the present invention.

The mechanically deagglomerated precipitated metal silicates can be used, in proportions of from 0.5% to 99.5%, by weight, for synthesizing both the single-pigmentary-species aggregate pigments and the composite aggregate pigments. As was established empirically, the optical and functional properties of aggregate pigments made from such mechanically deagglomerated subpigmentary raw materials are often more favorable than those of aggregate pigments made of analogous conventional (nondeagglomerated) raw materials.

A most striking functional property of the aggregate pigments made totally, or partially, of the precipitated calcium-silicate and/or alumino-silicate raw materials is their extremely high bulking characteristic. For example, aqueous slurries of the aggregate pigments in question are completely gelled at solids levels as low as 20-30%, the thixotropy of the aggregate pigments made of mechanically deagglomerated subpigmentary raw materials being even more pronounced than that of aggregate pigments made of analogous nondeagglomerated ones. In comparison, the single-pigmentary-component aggregate pigments from Example I, made of a very-fine-particle-size kaolin clay, can be converted into aqueous slurries with solids of up to 60-68% while the composite aggregate pigments from Example V, made of a 25:75 fine-particle-size calcined clay/very-fine-particle-size kaolin clay raw-material blend, can be converted into aqueous slurries with solids of up to 50-55%.

The extreme bulking characteristic of the above-mentioned aggregate pigments has some important practical implications. First of all, dictated by obvious economic reasons, the high-bulking pigments in question must be transported to customers in a dry form, the preparation of pigment slurries being carried out on the customers, premises. Secondly, the preparation of the latter slurries is best carried out with the aid of continuous makedown equipment, such as is relatively uncommon in the pigment, paper or paint industries. Thirdly, the role of the above ultrahigh-bulking pigments in paper coatings and in paints is limited mainly to that of rheological adjuvants and antisagging agents. The latter ultrahigh bulking properties, however, render the aggregate pigments in question uniquely suitable for paper-filling applications, providing a very high first-pass filler retention along with very high levels of uniformity of the spatial distribution of the retained filler particles throughout the paper web.

The brightness of the aggregate pigments of the present invention, made from commercial pigmentary raw materials whose brightness ranges from about 85% to 100%, is generally higher than needed for most paper-coating or filling applications. For example, the brightness of conventional paper products ranges from only 58% for newsprint to 85% for the No. 1 coated merchant-grade paper. It is thus a common practice in the art to tone down the superfluous margin of sheet brightness associated with the use of $TiO_2$, calcined clay and similar fillers by adding nigrosine or carbon black directly to the papermaking furnish. However, the latter approach is quite inefficient and cumbersome, a modest gain of sheet opacity frequently being outweighed by numerous detrimental side effects. In contrast, the aggregate pigments of the present invention, containing much smaller proportions of identical black dyes or carbon black, built permanently into the aggregate-pigment structure, provide opacifying efficacies which are impossible to attain with any combination of similar nonaggregated white pigments and opacifying agents acceptable in practice; yet these aggregate pigments are completely free of any adverse side effects.

As is well known to those skilled in the art, the highest levels of opacifying are obtained with the use of highly disperse carbon blacks. The diameters of the so-called elementary particles of the finest contemporary carbon black products are equal to about 9 nm; however, even the best carbon-black dispersions, made in accordance with the prior-art practices, consist of multiparticle aggregates considered as further "undispersable." As has been well established in the paper industry, the opacifying power of carbon black used in the form of commercially available waterborne dispersions is about 100 to 150 times higher that of $TiO_2$. On the other hand, specially deagglomerated carbon black dispersions, permanently built into the aggregate pigments of the present invention, provide from 2000 to 5000 times more opacifying power than $TiO_2$.

To attain the latter opacifying efficacy, the commercial aqueous dispersions of carbon black must first be deagglomerated by the "master-batch" method disclosed by the applicant in the previously mentioned U.S. Pat. No. 5,116,418. In accordance with the above method, waterborne carbon black dispersions are exposed to an intensive shearing in concentrated aqueous pastes of subpigmentary particulates, such as deagglomerated precipitated metal silicates. Sigma-blade or similar heavy-duty high-shear mixers, preferably equipped with cooling jackets, are well suited for the above purpose.

The resultant master batches, optimally containing 1–3%, by weight, deagglomerated carbon black, are incorporated into the aggregate structure of the aggregate pigments under discussion in the same manner as other particulate constituents. To obtain a complete immobilization of carbon-black particles, it is necessary to simultaneously incorporate 2–3% of polymer-emulsion adhesives, preferably the previously-mentioned ultrafine ones with average particle diameters smaller than 55 nm, into the aggregate-pigment structure. A total immobilization of carbon-black particles is even more facilitated by adding up to 0.5%, in relation to the aggregate-pigment mass, of the previously mentioned cationic polyelectrolytes into the solutions of the bivalent and multivalent inorganic cross-linking salts when synthesizing the aggregate pigments in question.

Practically significant opacifying effects can be obtained already with as little as 0.005%, by weight, of carbon black incorporated into the aggregate-pigment structure. Carbon black levels of up to 0.15%, by weight, are still practical for synthesizing aggregate pigments intended for newsprint and similar applications, particularly if the pigmentary raw materials used in the synthesis are very bright.

Yet another type of aggregate pigment of the present invention, uniquely suited for newsprint applications, is synthesized by incorporating from 0.5% to 25%, by weight, of high-oil-absorption particulate materials into the aggregate-pigment composition. The best such materials, effectively curtailing the undesirable ink strike-through and smearing typical of contemporary lightweight newsprint papers, are, for example, bentonite, montmorillonite or synthetic, chemically treated calcium silicates, such as Hubersorb 600, absorbing up to 450 mg of oil per one gram of the particulate material. The latter materials should have a very high specific surface area, preferably in excess of 100 $m^2/g$, the largest particles being essentially 100%, by weight, finer than 5 $\mu$m e.s.d. It is worth pointing out that aggregate pigments containing the high-oil-absorption materials are very thixotropic, which is overall beneficial to paper-filling applications.

As is well known to those skilled in the art, the traditional filler pigments, such as kaolin clay, calcined clay or even titanium dioxide, perform relatively better in the acidic papermaking process than in the alkaline one, for which the water-ground and precipitated calcium carbonates are the preferred filler materials. The likely reason for the latter performance difference is that the affinity of polymer chains of the high-molecular-weight retention agents used in the alkaline papermaking process is much higher in relation to the marginally soluble and chemically reactive (dissociating) calcium carbonate than to the chemically inert filler pigments used in the acidic process. It suffices, however, to build as little as 0.5–15%, by weight, of a pigmentary calcium carbonate into aggregate pigments made of inexpensive clay or other similar raw materials to impart to the latter pigments adequate levels of affinity towards polymeric retention aids, thus rendering them more suitable as fillers for alkaline papermaking applications.

In general, the extraneously precipitated and/or water-ground calcium carbonates, as the extraneously precipitated calcium silicate, calcium sulfate, hydrated alumina, hydrated silica and alumino-slicates, can be used by themselves or combined with other pigmentary and subpigmentary raw materials in proportions of from 0.5% up to 99.5%, by weight, to synthesize the aggregate pigment products of the present invention. In comparison, the subpigmentary calcium carbonates obtained by a direct chemical precipitation or intensive comminution of corresponding pigmentary materials, having particles with diameters ranging from 0.01 to 0.1 $\mu$m, should be incorporated into the aggregate pigments in significantly lower proportions, amounting to about 0.5% to 5% of the aggregate-pigment mass.

The troublesome white and black pitch, forming in both the acidic and alkaline papermaking processes, can be eliminated readily with the aid of functional aggregate filler pigments of the present invention containing talcum. The latter material, whose largest particles should be essentially 100%, by weight, finer than 5 $\mu$m e.s.d., can be incorporated into the functional pitch-combating aggregate filler-pigments under discussion in proportions of from 2% to 20% of the aggregate-pigment mass. Used as the basic pigmentary raw material, however, talcum can be incorporated into the aggregate pigments in proportions of from 0.5% to 99.5% of the aggregate-pigment mass.

Functional pigments with an extra-high pitch-combating efficacy are obtained by incorporating from about 0.5% to 5%, by weight, of an ultrafine (subpigmentary) talcum into the aggregate filler-pigments of the present invention. The ultrafine talcum, having average particle dimensions ranging from about 0.01 μm to 0.1 μm, is obtained by an intensive comminution of commercial talcum.

While mineral pigments are inherently hydrophilic, thus more or less difficult to use with organic media, arbitrary levels of organophilic properties can be imparted to the aggregate pigments of the present invention, rendering them readily compatible with synthetic organic fibers, plastics or solvent-based paints and lacquers. The organophilic properties in question are obtained with the aid of organic, cationically active chemical compounds with at least two reactive groups in each molecule added to the solutions of the inorganic cross-linking salts employed in synthesizing the complex microgel cements used in making the aggregate pigments under discussion.

The above-mentioned organic, cationically active chemical compounds, capable of participating (along with the inorganic salts) in cross-linking of the transient, chemically reactive subcolloidal sodium-silico-aluminate and similar hydrosols, are too numerous to list. The latter agents can be selected most readily, however, from three well-defined generic groups of chemical compounds, namely, cationic surface active agents, e.g., Hyamine 2389 (methyldodecylbenzyl-trimethyl ammonium chloride-methyldodecylxylene bis[trimethyl ammonium chloride]); Werner complexes, e.g., Quilon M (a colorless bivalent organo-metallic complex in which a fatty acid is coordinated with aluminum); and cationic polyelectrolytes, e.g., polyacrylamides. These functional organic compounds should be added sparingly to the solutions of the inorganic cross-linking salts employed, only to the extent needed to impart the desired levels of surface-chemical modification to the in-situ synthesized complex functional microgels, hence, indirectly also to the resultant aggregate pigment products. It is important, however, to monitor the cementing efficacy of the evolving inorganic/organic (hybrid) microgels in that this efficacy may deteriorate perceptibly with the increasing levels of the above-mentioned cationic organic materials built into the microgel structure.

To compensate for the above-mentioned deterioration of the microgel's cementing efficiency, up to 5%, by weight, of water-soluble and/or disperse polymer adhesives should be built into the aggregate-pigment structure.

The organic, cationically active compounds in question can best be screened with the aid of the contact angle method, which makes it possible to assess the required level of addition of the above materials to impart the proper degree of organophilic properties to aggregate pigments, to make them compatible with arbitrary organic media. According to the present experimental findings, the above cationically active compounds are capable of a practically significant modification of the surface-chemical properties of the resultant aggregate pigments if used in proportions amounting to only 0.001% to 0.005%, by weight, of the aggregate-pigment mass. A strongly pronounced surface-chemical modification of the aggregate pigments can be obtained with only slightly higher levels of the organic, cationically active materials built into the complex microgels, a level of 0.5%, in relation to the aggregate-pigment mass, being envisaged as the practical limit.

Another type of functional composite pigment of the present invention with controlled organophilic properties can be obtained by incorporating from 0.5% to 5%, by weight, of organic, non-film-forming spherical particulates into the aggregate pigment structure. The latter organic particulates, encompassing pigmentary, high-glass-transition-temperature polyacrylates and polystyrene with average particle diameters of from about 0.15 μm to 0.5 μm, impart very favorable ink-receptivity and ink-vehicle-dissipation characteristics to the aggregate pigments under discussion, also enhancing the penetration of organic liquids (saturation) into papers filled with such pigments. Used in proportions of up to 20% of the aggregate-pigment mass, the above organic particulates can make also a significant contribution to the optical-performance efficacy of the resultant aggregate pigments.

Still another type of functional aggregate pigment of the present invention, imparting extra-high levels of ink receptivity to paper coatings containing these pigments, can be synthesized by incorporating from 0.25 to 5%, by weight, of ultrafine, non-film-forming spherical polystyrene particles with an average diameter of about 0.03 μm, sold under the commercial name of Lytron 603, into the aggregate-pigment mass.

While certain preferred practices and embodiments of this invention have been set forth in the foregoing specification, it is understood by those skilled in the art that other variations and modifications may be employed within the scope of the teachings of the present invention. The detailed description is, therefore, not to be taken in a limiting sense and the scope of the present invention is best defined by the claims to follow.

What is claimed is:

1. Aggregate pigment products comprising up to 99.5%, by weight, of at least one low-refractive-index pigmentary species and from 0.5% to 10%, by weight, as determined by ashing, of an in-situ synthesized complex functional microgel cement, wherein the constituents of said microgel cements are:
  (a) from 0.5% to 10%, in relation to the total mass of said aggregate pigment, of a transient, chemically reactive subcolloidal hydrosol formed of
    (1) at least one reagent selected from the group consisting of alkali-metal silicates and quaternary ammonium silicates; and
    (2) at least one reagent selected from the group consisting of alkali-metal aluminates and alkali-metal zincates, the ratio of the reagents of (1) to the reagents of (2) being from 1:10 to 10:1, by weight;
  cross-linked by
  (b) at least one gel-setting agent selected from the group consisting of bivalent and multivalent inorganic salts in an amount of from 0.5% to 10%, by weight, in relation to the total mass of said aggregate pigment, and, optionally, at least one organic, cationically active chemical compound with two or more reactive groups in each molecule in an amount of from 0.001% to 0.5%, by weight, in relation to the total mass of said aggregate pigment, the ratio of said gel-setting agents to said chemically reactive, subcolloidal hydrosol ranging from 1:10 to 10:1.

2. Aggregate pigment products according to claim 1, additionally comprising at least one of the following materials:
   (a) from 0.5% to 99.5%, by weight, of at least one mineral subpigmentary material;
   (b) from 0.5% to 25%, by weight, of at least one particulate high-oil-absorption material with a specific surface area larger than 100 m$^2$/g;
   (c) from 0.5% to 20%, by weight, of at least one organic, pigmentary non-film-forming material;
   (d) from 0.25% to 5%, by weight, of at least one organic, subpigmentary non-film-forming material;
   (e) from 0.25% to 5%, by weight, of at least one polymer-emulsion adhesive;
   (f) from 0.25% to 5%, by weight, of at least one water-soluble polymer adhesive;
   (g) from 0.001% to 0.5%, by weight, of at least one organic, cationically active chemical compound with at least two reactive groups in each molecule;
   (h) from 0.005% to 5%, by weight, of at least one color dye;
   (i) from 0.005% to 0.15%, by weight, of carbon black; and
   (j) from 0.1% to 2%, by weight, of at least one microfibril.

3. Aggregate pigment products according to claim 1, wherein said at least one pigmentary species is selected from the group consisting of kaolin clay, calcined clay, talcum, water-ground calcium carbonate, precipitated calcium carbonate, precipitated calcium silicate, precipitated calcium sulfate, precipitated hydrated alumina, precipitated hydrated silica and precipitated aluminosilicates.

4. Aggregate pigment products according to either of claims 1 or 2, wherein said at least one bivalent and multivalent inorganic cross-linking salt is selected from the group consisting of colorless salts of calcium, magnesium, barium, aluminum, zinc and zirconium.

5. Aggregate pigment products according to claim 2, wherein said at least one mineral subpigmentary material is selected from the group consisting of precipitated ultrafine calcium carbonates, mechanically deagglomerated precipitated calcium silicates, mechanically deagglomerated precipitated alumino-silicates, and intensively comminuted talcum.

6. Aggregate pigment products according to claim 2, wherein said at least one particulate high-oil-absorption material with a specific surface area larger than 100 m$^2$/g is selected from the group consisting of montmorillonite, bentonite and synthetic absorbent grades of calcium silicates and alumino-silicates whose largest particles are essentially 100%, by weight, finer than 5 $\mu$m e.s.d.

7. Aggregate pigment products according to claim 2, wherein said at least one organic, pigmentary non-film-forming material is selected from the group consisting of spherical polyacrylic particulates and spherical polystyrene particulates having an average diameter ranging from 0.15 $\mu$m to 0.5 $\mu$m.

8. Aggregate pigment products according to claim 2, wherein said at least one organic, subpigmentary non-film-forming material is selected from the group consisting of spherical polystyrene particulates having an average diameter of about 0.03 $\mu$m.

9. Aggregate pigment products according to claim 2, wherein said at least one organic polymer-emulsion adhesive is selected from the group consisting of commercial latex adhesives, having particle diameters larger than 70 nm, and ultrafine acrylic polymer-emulsion adhesives, having particle diameters finer than 55 nm and glass-transition temperatures ranging from $-60°$ C. to $+20°$ C.

10. Aggregate pigment products according to claim 2, wherein said at least one water-soluble organic polymer adhesive is selected from the group consisting of starch and polyvinyl alcohol.

11. Aggregate pigment products according to either of claims 1 or 2, wherein said at least one organic, cationically active chemical compound with at least two reactive groups in each molecule is selected from the group consisting of cationic surfactants, organometallic Werner complexes and high-molecular-weight cationic polyelectrolytes.

12. Aggregate pigment products according to claim 2, wherein said at least one color dye is selected from the group consisting of organic and inorganic particulate dyes and organic, ionically active soluble dyes.

13. Aggregate pigment products according to claim 2, wherein said carbon black is prepared by the masterbatch method employing a mechanical deagglomeration of naturally aggregated carbon-black particles, exposed to high-shear forces in concentrated pastes of subpigmentary mineral particles.

14. Aggregate pigment products according to claim 2, wherein said at least one microfibril is selected from the group consisting of synthetic microfibrils, and cellulosic microfibrils, with the length ranging from 1 $\mu$m to 10 $\mu$m, said cellulosic microfibrils being obtained by a cascade multi-stage defibrillation of cellulosic fibers comprising the steps of
   (a) chopping of the fibers to a length preventing hydraulic spinning in the subsequent refining operations;
   (b) refining of fibers from step (a) at solids concentrations of up to 30–35%, by weight;
   (c) additional refining of fibers from step (b) with the aid of centrifugal comminutors; and
   (d) finalizing the defibrillation obtained in step (c) with the aid of homogenizers, in which the fibrous furnish is compressed at very high pressures and then rapidly decompressed by passing through a nozzle, causing the residual bundles of fibrils to explosively separate into individual microfibrils.

* * * * *